(12) United States Patent
Abraham et al.

(10) Patent No.: US 11,773,244 B2
(45) Date of Patent: Oct. 3, 2023

(54) THERMOPLASTIC VULCANIZATES AND COMPOSITIONS THEREOF

(71) Applicant: Celanese International Corporation, Irving, TX (US)

(72) Inventors: Tonson Abraham, Avon, OH (US); Michael J. Goncy, Mont Belvieu, TX (US); Leander M. Kenens, Vlaams Brabant (BE)

(73) Assignee: Celanese International Corporation, Irving, TX (US)

( * ) Notice: Subject to any disclaimer, the term of this patent is extended or adjusted under 35 U.S.C. 154(b) by 125 days.

(21) Appl. No.: 16/762,838

(22) PCT Filed: Sep. 21, 2018

(86) PCT No.: PCT/US2018/052133
§ 371 (c)(1),
(2) Date: May 8, 2020

(87) PCT Pub. No.: WO2019/094112
PCT Pub. Date: May 16, 2019

(65) Prior Publication Data
US 2021/0122908 A1    Apr. 29, 2021

Related U.S. Application Data

(60) Provisional application No. 62/584,255, filed on Nov. 10, 2017.

(30) Foreign Application Priority Data

Jan. 17, 2018  (EP) ..................................... 18152091

(51) Int. Cl.
*C08L 23/16*     (2006.01)
*C08L 23/12*     (2006.01)
(Continued)

(52) U.S. Cl.
CPC ................ *C08L 23/12* (2013.01); *C08K 3/04* (2013.01); *C08K 3/32* (2013.01); *C08L 2207/02* (2013.01); *C08L 2312/04* (2013.01)

(58) Field of Classification Search
None
See application file for complete search history.

(56) References Cited

U.S. PATENT DOCUMENTS 6,051,681 A      4/2000  Dozeman et al.
7,439,304 B2 *  10/2008  Ellul ........................ C08L 23/16
                                                             524/101
(Continued)

FOREIGN PATENT DOCUMENTS

CN          1880366 A       12/2006
WO    WO 2012/030577 A1     3/2012

OTHER PUBLICATIONS

International Search Report and Written Opinion for PCT/US2018/052133, dated Nov. 15, 2018.
(Continued)

*Primary Examiner* — Richard A Huhn
(74) *Attorney, Agent, or Firm* — Dority & Manning, P.A.

(57) ABSTRACT

Disclosed is a thermoplastic vulcanizate composition with a dispersed phase of a rubber, partially cured in a phenolic resin curing agent, and a continuous thermoplastic phase including at least one thermoplastic polymer, where the composition has one or more of the following properties: (i) an epoxidized soy bean oil is added after the partial curing of the rubber phase; (ii) a combination of an alkyl radical scavenger and an alkyl phosphite is added during the partial curing of the rubber phase; (iii) the thermoplastic phase has ≥10 wt % polypropylene having a heat of fusion >80 J/g, and the composition includes (a) stannous chloride; (b) a non-basic hindered amine light stabilizer; and/or (c) both (a) and
(Continued)

(b); and (iv) where (i) to (iii) include carbon black in the composition.

27 Claims, 14 Drawing Sheets

(51) Int. Cl.
*C08K 3/04* (2006.01)
*C08K 3/32* (2006.01)

(56) References Cited

U.S. PATENT DOCUMENTS

| | | | | |
|---|---|---|---|---|
| 2002/0137835 | A1* | 9/2002 | Abraham | C08L 23/04 524/529 |
| 2003/0120077 | A1* | 6/2003 | Galbo | C07D 211/98 546/188 |
| 2007/0037931 | A1* | 2/2007 | Chung | C08L 23/16 525/192 |
| 2007/0244254 | A1 | 10/2007 | Abraham et al. | |
| 2012/0059105 | A1* | 3/2012 | Kerstetter, III | C08L 23/142 524/412 |

OTHER PUBLICATIONS

Use of vitamin E in polymer stabilization, Wang Kezhi et al, Plastic Technology, No. 4, pp. 28-32 (characterized in Chinese Office Action).
Chinese Office Action (and English Translation) Corresponding to Application No. 201880081511.7 dated Jun. 13, 2022.

\* cited by examiner

THERMOPLASTIC VULCANIZATES AND COMPOSITIONS THEREOF

CROSS-REFERENCE OF RELATED APPLICATIONS

This application is a National Phase Application claiming priority to PCT Application Serial No. PCT/US2018/052133 filed Sep. 21, 2018, which claims priority to and the benefit of U.S. Provisional Application No. 62/584,255, filed Nov. 10, 2017 and EP 18152091.7, filed Jan. 17, 2018, and are the disclosures of which incorporated herein by reference in their entirety.

FIELD

This present invention relates to methods for improving the weatherability (i.e., ultraviolet (UV) stability) of phenolic resin cured thermoplastic vulcanizates, produced by the dynamic vulcanization of ethylene-propylene-diene (EPDM) rubbers in polypropylene (PP), their manufacture, and use thereof.

BACKGROUND

Thermoplastic vulcanizates (TPVs) are a diverse family of rubber-like materials that exhibit the physical properties of thermoset rubbers and the melt processability of thermoplastic materials. At room temperature (about 23° C.), Polypropylene/Ethylene-Propylene-Diene (PP/EPDM) TPVs comprise crosslinked rubber particles that are swollen in paraffinic oil and contained in a continuous paraffinic oil-swollen PP matrix. For the UV degradation of polymeric materials, the simultaneous presence of oxygen (air) and UV radiation is necessary. Amorphous (non-crystalline) EPDM rubber, which contains both copolymerized ethylene and propylene molecules, is less UV stable than PP, as generally only 50 wt % of PP is degradable, since the crystalline phase of PP is impermeable to air. Compounding fine carbon black (19 nm size) into a polyolefin is an effective method for polyolefin UV stabilization. Carbon black absorbs UV radiation (that initiates polymer oxidative degradation), and dissipates the energy absorbed as heat (infrared radiation) which is much less detrimental to polymer degradation than UV radiation. While carbon black-filled TPVs provide adequate sealing performance in outdoor applications, the graying of the black automotive weather seals on outdoor exposure is unacceptable. The appearance change is due to surface micro-cracking (up to a depth of about 10 μm after a 1500 hr weatherometer "Kalahari" test VW PV3929) caused by PP degradation. A need exists, therefore, for novel thermoplastic vulcanizate compositions useful for outdoor articles that are weatherable to thermooxidation and UV degradation.

U.S. Pat. No. 6,051,681 discloses a process for preparing of a thermoplastic elastomer comprising preparing a blend of a rubber and a thermoplastic resin, in which the rubber is at least partially vulcanized by using a phenolic curative and in which a combination of a HALS compound and a Lewis base (hydrotalcite) is added after the desired degree of vulcanization of the rubber is obtained. Hydrotalcite is a particulate inorganic material with basic moieties on the particle surface that can presumably neutralize the acidic phenolic resin curative residues in the TPV, thus improving UV stability of the TPV. However, no evaluation of weathering resistance by TPV color change was conducted in that patent, nor were black PP/TPDM TPVs evaluated, as presently evaluated in this invention.

It is generally known that the UV stability of PP/EPDM TPVs that are cured by hydrosilylation or peroxide can readily be improved by the use of HALS. The bulk of the commercially available PP/EPDM TPVs are cured by phenolic resin, as there are several advantages to using this cure system. However, phenolic resin-cured TPVs cannot be stabilized by HALS as the basic HALS is neutralized by the phenolic resin curative (about 1 wt %) that is added at a much higher concentration in the TPV formulation than heat or UV stabilizers (generally used at a maximum of 0.4 wt %). The HALS would have to be compounded into the TPV melt post cure, in order to allow the phenolic resin to cure the rubber. Adding excess HALS post cure, in order to neutralize the acidic phenolic resin curative residues, and to still have enough HALS for UV stabilization of the TPV, in addition to greatly increasing product cost, would be counterproductive as the buildup of polar amine salts on the surface of the non-polar fabricated part from the TPV is unacceptable. Moreover, the basic HALS can undergo degradation via the Hoffman elimination process, when compounded into the acidic phenolic resin at high temperature (200-240° C.). Thus, conventional methods (use of HALS) for the UV stabilization of polyolefins are inapplicable to the UV stabilization of phenolic resin cured PP/EPDM TPVs.

U.S. Pat. No. 7,439,304 discloses the minimal levels of stannous chloride required to obtain an efficient cure for PP/EPDM TPVs, and thus to achieve a product with good rubber properties and low moisture absorption and that a certain level of stannous chloride in the TPV formulation is required for the decomposed phenolic resin to function as an anti-oxidant. As already explained, the decomposed phenolic resin in PP/EPDM TPVs functions as the product antioxidant, but is detrimental to product UV stability. In this work it is disclosed that slightly increasing the stannous chloride level over that generally recommended in the art improves product UV resistance.

The inventors have unexpectedly discovered that epoxidized soy bean oil, a neutralizer for the acidic phenolic curative residues in the PP/EPDM TPV, when added after curing the EPDM can produce a weather-resistant TPV. Furthermore, the inventors have discovered that melt blended an alkyl radical scavenger (e.g., Vitamin E) and a fast acting hydrolytically stable alkyl phosphite melt processing stabilizer into the rubber/plastic blend prior to adding the phenolic resin curative, greatly improves PP/EPDM TPV UV stability. Finally, the inventors have demonstrated herein that the UV stability of phenolic resin cured PP/EPDM TPVs can be achieved by using high isotacticity (i.e., high crystallinity) PP as the plastic phase. The lower amorphous content and the lower atactic PP content (both these phases are air permeable and thus UV degradable) in these highly crystalline PPs, compared with equivalent molecular weight isotactic PPs produced with conventional catalysts, is presumably responsible for the observed improvement in TPV UV resistance.

SUMMARY

Disclosed herein is a thermoplastic vulcanizate composition comprising (A) a dispersed rubber phase, including a rubber that has been partially cured in the presence of a phenolic resin curing agent; and (B) a continuous thermoplastic phase, including at least one thermoplastic polymer; wherein the composition further comprises carbon black and one or more of the following: (I) the composition further comprises an epoxidized soy bean oil; (II) the composition further comprises a mixture of an alkyl radical scavenger and an alkyl phosphite; (III) the thermoplastic phase comprises at least about 10 wt % of one or more polypropylene compound(s) based on the total weight of the thermoplastic phase, wherein the one or more propylene compound(s) has a heat of fusion of greater than about 95 J/g; (IV) the thermoplastic phase comprises at least about 10 wt % of one or more polypropylene compound(s) based on the total weight of the thermoplastic phase, wherein the one or more polypropylene compound(s) has a heat of fusion of greater than about 80 J/g and the composition includes (i) about 0.25 to about 0.35 wt % of stannous chloride, based on the total weight of the phenolic resin curing agent and the stannous chloride; (ii) a non-basic hindered amine light stabilizer; or (iii) a non-basic hindered amine light stabilizer and stannous chloride.

DETAILED DESCRIPTION OF THE EMBODIMENTS

Figure 1:
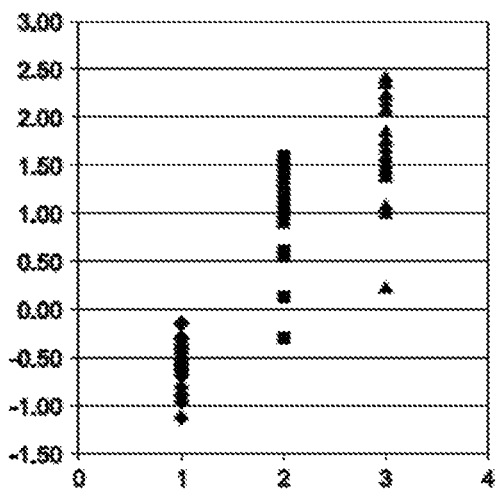
FIG. 1 shows the results of weathering testing of TPVs of Examples 1-2.
Figure 1:
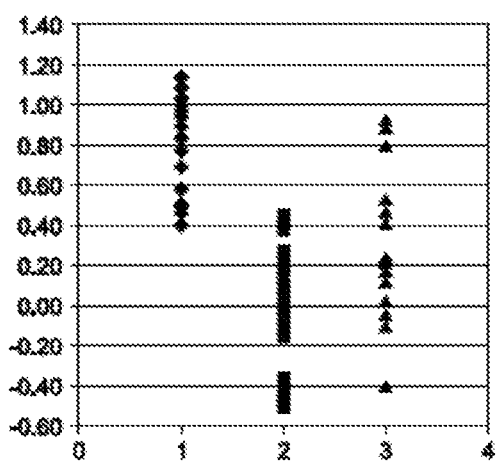

The present disclosure relates to thermoplastic vulcanizate compositions (TPVs) comprising a dispersed phase of a rubber, that has been at least partially cured in the presence of a phenolic resin curing agent, and a continuous thermoplastic phase including at least one thermoplastic polymer. It is well known that TPVs of this type are particularly susceptible to UV-induced degradation, which can lead to undesirable surface cracking, surface roughness and/or discoloration of components molded from these compositions. According to the present disclosure, it has now been found that significant improvement in UV stability can be achieved by effecting one or more of the following modifications to existing TPV compositions and TPV production processes: (i) adding an epoxidized soy bean oil to the TPV after at least partial curing the rubber phase; (ii) adding an alkyl radical scavenger and an alkyl phosphite to the TPV during curing of the rubber phase; and (iii) including at least 10 wt % of a polypropylene, based on the total weight of the thermoplastic phase, where the polypropylene has a heat of fusion greater than 80 J/g and (a) adding stannous chloride to the TPV; and/or (b) adding a non-basic hindered amine light stabilizer to the TPV.

Among the major components of PP/EPDM TPVs (PP, paraffinic oil, cross-linked particulate rubber containing carbon black UV absorber), it is well known that PP that undergoes severe UV degradation, as explained earlier. The acidic decomposition products of the phenolic resin curative (that functions as an antioxidant) are soluble in the paraffinic oil present in the TPV. Thus, sub-micron pools of oil in the PP phase are destabilized to UV radiation by the presence of the decomposed phenolic resin residues. Hence, an oil-soluble neutralizer for the phenolic resin, such as epoxidized soy bean oil, is effective in reducing the detrimental effects of the phenolic antioxidant on product UV resistance, as mentioned earlier.

Furthermore, data suggests that the much more UV stable oil (than PP) allows deeper penetration of UV radiation in a test piece molded from a PP/paraffinic oil melt blend versus a test piece molded from PP alone. Thus, surface degradation was lower, based on molecular weight after UV exposure, for a UV exposed test piece molded from a PP/paraffinic oil melt blend versus a test piece molded from PP alone. Of course, in the PP/paraffinic oil melt blend test piece, there is less PP for degradation, compared with PP alone. Deeper penetration of UV rays into the surface of a PP/EPDM TPV part allows UV absorption and dissipation of UV energy as heat by the carbon black carrying rubber particles, thus causing less surface damage in comparison to the case where the oil is not UV stabilized. The factors discussed above probably contribute to the improved UV aging of phenolic resin cured PP/EPDM TPVs, when epoxidized soy bean oil is added to this product after cure (in order to prevent cure interference).

In another embodiment of the invention, adding an alkyl radical scavenger in combination with an alkyl phosphite has been shown to improve the UV resistance of PP/EPDM TPVs, but not of PP. It is believed that under low shear compounding conditions, fewer radicals are generated during PP melt processing conditions, as opposed to a higher PP radical level generated during the reactive extrusion and subsequent processing of a PP/EPDM TPV, due to high melt viscosity that is created by the presence of oil-swollen, crosslinked EPDM particles that fills the oil solution of PP. In the former case, residual unused alkyl radical scavenger may be the cause of the poor UV stability of PP that is process stabilized with an alkyl radical scavenger/phosphite combination.

As stated earlier, conventional HALS is unsuitable for the UV stabilization of phenolic resin cured PP/EPDM TPVs. Less basic NOR HALS (compounded into polyolefin films for UV stabilization, when the films are in external contact with acidic materials such as pesticide residues during use, in applications such as polyethylene agricultural mulch film) have also been found to be ineffective in the UV stabilization of PP/EPDM TPVs. In NOR, "N" is part of a 2,2,6,6-tetramethylpiperidinyl group, and "R" is an alkyl group. Unexpectedly, in this work it was discovered than an even less basic HALS than NOR HALS is effective in the UV stabilization of PP/EPDM TPVs. This HALS is an N-Acetyl HALS (N-(N'-Acetyl-2,2,6,6-tetramethylpiperidin-4-yl)-3-dodecyl-2,5-pyrrolidindione), Hostavin 3058, from Clariant Corporation. It is believed that Hostavin 3058 is effective in the UV stabilization of phenolic resin cured PP/EPDM TPVs owing to its very low basicity, and its solubility in paraffinic oil. Note that the source of UV instability is due to the presence of the oil-soluble decomposition products of the phenolic resin curative. Hostavin 3058 provides an additional advantage in reducing the melt viscosity of PP/EPDM TPVs, thus improving ease of product fabrication, and also providing improved fabricated product surface appearance.

The effect in UV stability by adding an alkyl radical scavenger and alkyl phosphite is unexpected, given the known adverse effect of phenolic antioxidants on polyolefin UV stability. It is speculated that shear degradation of PP during TPV production and subsequent fabrication (by injection molding, for example) results in the oxidation of PP in Santoprene. This results in poor product UV resistance and variability in UV resistance, as the ingress of oxygen into the molten PP/EPDM TPV is uncontrolled. Presumably, under oxygen starved conditions that exists in an extruder, an alkyl radical scavenger can better compete with oxygen in quenching the initially formed carbon centered radicals with hydrogen, thus limiting PP oxidation, thereby improving product UV resistance. It is important to keep the alkyl radical scavenger level low in order to limit the detrimental effect of this phenolic antioxidant on product UV resistance, as explained earlier. In this connection, it is also necessary to use a fast acting phosphite to decompose any hydroperoxides formed, so that the alkyl radical scavenger is not consumed by delivering hydrogen atoms to oxygen centered radicals, which, of course, results in oxidized polymer. The use of a fast acting phosphite conserves the alkyl radical scavenger for hydrogen atom transfer to carbon centered PP radicals. Recently, a combination of an alkyl radical scavenger and a fast acting, hydrolytically stable alkyl phosphite, has been shown to be a very effective melt processing stabilizer for polyolefins, including PP.

Rubber Phase

The rubbers that may be employed to form the rubber phase of the present TPV composition include those polymers that are capable of being cured or crosslinked. Reference to a rubber may include mixtures of more than one rubber. Non-limiting examples of rubbers include olefinic elastomeric copolymers, butyl rubber, and mixtures thereof. In one or more embodiments, olefinic elastomeric copolymers include ethylene-propylene-non-conjugated diene rubbers or propylene-based rubbery copolymers containing units derived from non-conjugated diene monomers.

The term ethylene-propylene rubbers refers to rubbery copolymers polymerized from ethylene, propylene, and at least one diene monomer. The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof.

The ethylene-propylene rubber may include from about 40 to about 85% by weight, or from about 50 to about 70% by weight, or from about 60 to about 66% by weight of units derived from ethylene based on the total weight of ethylene and propylene in the rubber. In addition, the rubber may contain from about 0.1 to about 15% by weight, or from about 0.5 to about 12% by weight, or from about 1 to about 10% by weight, or from about 2 to about 8% by weight of units derived from diene monomer. Expressed in mole percent, the rubber may include from about 0.1 to about 5 mole percent, or from about 0.5 to about 4 mole percent, or from about 1 to about 2.5 mole percent units derived from diene monomer. In one or more embodiments, where the diene includes 5-ethylidene-2-norbornene, the ethylene-propylene rubber may include at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-ethylidene-2-norbornene. In one or more embodiments, where the diene includes 5-vinyl-2-norbornene, the ethylene-propylene rubber may include at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-vinyl-2-norbornene.

The ethylene-propylene rubber may have a weight average molecular weight ($M_w$) that is greater than 100,000 g/mole, or greater than 200,000 g/mole, or greater than 400,000 g/mole, or greater than 600,000 g/mole. Preferably, the $M_w$ of the ethylene-propylene rubber is less than 1,200,000 g/mole, or less than 1,000,000 g/mole, or less than 900,000 g/mole, or less than 800,000 g/mole.

Useful ethylene-propylene rubbers may have a number average molecular weight ($M_n$) that is greater than 20,000 g/mole, or greater than 60,000 g/mole, or greater than 100,000 g/mole, or greater than 150,000 g/mole. The $M_n$ of the ethylene-propylene rubbers may be less than 500,000 g/mole, or less than 400,000 g/mole, or less than 300,000 g/mole, or less than 250,000 g/mole.

Molecular weights (number average molecular weight (Mn), weight average molecular weight (Mw), and z-average molecular weight (Mz)) are determined using a Polymer Laboratories Model 220 high temperature GPC-SEC (gel permeation/size exclusion chromatograph) equipped with on-line differential refractive index (DRI), light scattering (LS), and viscometer (VIS) detectors. It uses three Polymer Laboratories PLgel 10 m Mixed-B LS columns for separation using a flow rate of 0.54 ml/min and a nominal injection volume of 300 microliter, calibrated with polystyrene standard. The detectors and columns were contained in an oven maintained at 145° C. The stream emerging from the SEC columns was directed into the miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun et al., in Macromolecules, Volume 34, Number 19, pp. 6812-6820, (2001), incorporated herein by reference.

Solvent for the SEC experiment was prepared by dissolving 6 grams of butylated hydroxy toluene (BHT) as an antioxidant in 4 liters of Aldrich reagent grade 1,2,4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC. Polymer solutions were prepared by placing dry polymer in a glass container, adding the desired amount of BHT stabilized TCB, then heating the mixture at 160° C. with continuous agitation for about 2 hours. All quantities were measured gravimetrically. The TCB densities used to express the polymer concentration in mass/volume units are 1.463 g/mL at 22° C. and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc) =0.1048 for ethylene-propylene copolymers, and (dn/dc) =0.01048−0.0016 ENB for EPDM, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers. Units of parameters used throughout this description of the SEC method are: concentration is expressed in g/cc, molecular weight is expressed in g/mol, and intrinsic viscosity is expressed in dL/g.

The light scattering (LS) detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c,$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2$=0.0015 for ethylene homopolymer and $A_2$=0.0015−0.00001 EE for ethylene-propylene copolymers, where EE is the ethylene content in weight percent in the ethylene-propylene copolymer. $P(\theta)$ is the form factor for a mono-disperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=690 nm. For purposes of this application, where DRI and LS measurements conflict, LS measurements should be used for Mw and Mz, while DRI measurements should be used for Mn. And, although MWD (polydispersity) is taken as Mw/Mn, where DRI and LS measurements conflict, MWD should be determined as Mw (measured by LS)/Mn (measured by DRI), or $Mw_{LS}/Mn_{DRI}$.

The ethylene-propylene rubber used herein may also be characterized by having a Mooney viscosity ($ML_{(1+4)}$ at 125° C.) per ASTM D-1646, of from about 10 to about 500, or from about 50 to about 450.

In some embodiments, the ethylene-propylene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g.

In some embodiments, the ethylene-propylene rubber used herein may have a glass transition temperature ($T_g$), as determined by Differential Scanning calorimetry (DSC) according to ASTM E-1356 with a 10° C./min heating rate and a 10° C./min cooling rate, that is less than −20° C., in other embodiments less than −30° C., in other embodiments less than −50° C., and in other embodiments from about −20 to about −60° C.

Suitable ethylene-propylene rubbers may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts involving Group IV-VI metallocenes. Elastomeric copolymers are commercially available under the tradenames Vistalon™, commercially available from ExxonMobil Chemical Co.; Keltan™, commercially available from Arlanxeo; Nordel IP™, commercially available from Dow Chemical Co.; Nordel MG™, commercially available from Dow Chemical Co.; Royalene™, commercially available from Lion Copolymer; and Buna™, commercially available from Arlanxeo.

Generally, the rubber phase comprises from 10 to 80 wt %, such as from 15 to 70 wt %, such as from 20 to 60 wt % of the total weight of the thermoplastic vulcanizate composition.

The rubber is at least partially cured by employing dynamic vulcanization techniques. Dynamic vulcanization refers to a vulcanization or curing process for a rubber contained in a blend that includes the rubber and at least one thermoplastic resin. The rubber is vulcanized under conditions of shear and extension at a temperature at or above the melting point of the thermoplastic resin. The rubber is preferably simultaneously crosslinked and dispersed (preferably as fine particles) within the thermoplastic resin matrix, although other morphologies, such as co-continuous morphologies, may exist depending on the degree of cure, the rubber to plastic viscosity ratio, the intensity of mixing, the residence time, and the temperature.

After dynamic vulcanization, the rubber is in the form of finely-divided and well-dispersed particles of vulcanized or cured rubber within a continuous thermoplastic phase or matrix, although a co-continuous morphology is also possible. In those embodiments where the cured rubber is in the form of finely-divided and well-dispersed particles within the thermoplastic medium, the rubber particles typically have an average diameter that is less than 50 μm, or less than 30 μm, or less than 10 μm, or less than 5 μm, or less than 1 μm. In preferred embodiments, at least 50%, or at least 60%, or at least 75% of the rubber particles have an average diameter of less than 15 μm, or less than 10 μm, or less than 5 μm.

The rubber within the composition is preferably at least partially cured. In one or more embodiments, the rubber is advantageously completely or fully cured. The degree of cure can be measured by determining the amount of rubber that is extractable from the thermoplastic vulcanizate by using cyclohexane as an extractant. Preferably, the rubber has a degree of cure where not more than 15 wt %, or not more than 10 wt %, or not more than 5 wt %, or not more than 3 wt % is extractable by cyclohexane at 23° C. as described in U.S. Pat. Nos. 4,311,628, 5,100,947 and 5,157,081, all of which are incorporated herein by reference. Alternatively, the rubber has a degree of cure such that the crosslink density is at least $4\times10^{-5}$, or at least $7\times10^{-5}$, or at least 10×10$^{-5}$ moles per milliliter of rubber. See Crosslink Densities and Phase Morphologies in Dynamically Vulcanized TPEs, by Ellul et al., Rubber Chemistry and Technology, Vol. 68, pp. 573-584 (1995).

The rubber may be dynamically vulcanized by employing various cure systems, which are known in the art. For example, phenolic resin, hydrosilylation (a.k.a. silicon-containing cure systems), and free radical cure systems may be employed.

Useful phenolic cure systems are disclosed in U.S. Pat. Nos. 2,972,600, 3,287,440, 5,952,425 and 6,437,030, which are incorporated herein by reference. In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms.

An example of a phenolic resin curative includes that defined according to the general formula:

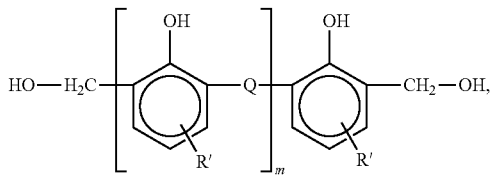

where Q is a divalent radical selected from the group consisting of —CH$_2$—, —CH$_2$—O—CH$_2$—; m is zero or a positive integer from 1 to 20 and R' is an organic group. In one embodiment, Q is the divalent radical —CH$_2$—O—CH$_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

The phenolic resin may be employed in an amount from about 2 to about 6 parts by weight, or from about 3 to about 5 parts by weight, or from about 4 to about 5 parts by weight per 100 parts by weight of rubber.

A complementary amount of stannous chloride may include from about 0.5 to about 2.0 parts by weight, or from about 1.0 to about 1.5 parts by weight, or from about 1.2 to about 1.3 parts by weight per 100 parts by weight of rubber. In conjunction therewith, from about 0.1 to about 6.0 parts by weight, or from about 1.0 to about 5.0 parts by weight, or from about 2.0 to about 4.0 parts by weight of zinc oxide may be employed. In one or more embodiments, the olefinic rubber employed with the phenolic curatives includes diene units derived from 5-ethylidene-2-norbornene.

Thermoplastic Phase

The thermoplastic resin phase includes those thermoplastic polymers that include solid, generally high molecular weight plastic resins. Exemplary thermoplastic polymers include crystalline, semi-crystalline, and crystallizable polyolefins, olefin homo and copolymers, and non-olefin resins.

The thermoplastic polymer may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the higher α-olefins, described above, or with C$_{10}$ to C$_{20}$ diolefins. Comonomer contents for these propylene copolymers may be from 1% to about 30% by weight of the polymer, for example, as in U.S. Pat. No. 6,867,260, which is incorporated by reference herein. Copolymers available under the tradename VISTAMAXX™, commercially available from ExxonMobil Chemical Co. are specifically included.

Other suitable polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

The thermoplastic polymer may include propylene-based polymers including those solid, generally high-molecular weight plastic resins that primarily comprise units deriving from the polymerization of propylene. In certain embodiments, at least 75%, or at least 90%, or at least 95%, or at least 97% of the units of the propylene-based polymer derive from the polymerization of propylene. In particular embodiments, these polymers include homopolymers of propylene.

In certain embodiments, the propylene-based polymers may also include units deriving from copolymerization with ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof.

The propylene-based polymers may include semi-crystalline polymers. These polymers may be characterized by a crystallinity of at least 25% by weight, or at least 55% by weight, or at least 65%, or at least 70% by weight. Crystallinity may be determined by dividing the heat of fusion of a sample by the heat of fusion of a 100% crystalline polymer, which is assumed to be 165 joules/gram for polypropylene.

In one or more embodiments, the propylene-based polymers may be characterized by a heat of fusion of at least 52 J/g, or in excess of 80 J/g, or in excess of 100 J/g, or in excess of 115 J/g. As will be discussed in more detail below, in some embodiments it may be desirable that the thermoplastic phase of the TPV comprises at least 10 wt % of a polypropylene (and/or a propylene-based polymer), based on the total weight of the thermoplastic phase, where the polypropylene has a heat of fusion greater than 80 J/g.

In one or more embodiments, useful propylene-based polymers may be characterized by an M$_w$ of from about 50 to about 2,000 kg/mole, or from about 100 to about 600 kg/mole. They may also be characterized by a M$_n$ of about 25 to about 1,000 kg/mole, or about 50 to about 300 kg/mole, as measured by GPC with polystyrene standards, using the test method described in the previous section.

In one or more embodiments, useful propylene-based polymers can have a MFR (ASTM D-1238, 2.16 kg @230° C.) of less than 200 dg/min, or less than 50 dg/min, or less than 10 dg/min, or less than 5 dg/min. In these or other embodiments, the propylene-based polymers can have a MFR of at least 0.1 dg/min, or 0.2 dg/min, or at least 0.5 dg/min.

In one or more embodiments, useful propylene-based polymers can have a melt temperature ($T_m$) that is from about 165° C. to about 170° C., based on the highest temperature of the melting endotherm ($2^{nd}$ heating cycle), recorded at a heating rate of 10° C./min by Differential Scanning Calorimetry, using the test method described in the previous section. They may have a glass transition temperature ($T_g$) of from about −10° C. to about 10° C., or from about −3° C. to about 5° C., or from about 0° C. to about 2° C. In one or more embodiments, they may have a crystallization temperature ($T_c$) of at least about 75° C., or at least about 95° C., or at least about 100° C., or at least 105° C., or ranging from 105 to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In particular embodiments, the propylene-based polymers include a homopolymer of a high-crystallinity isotactic or syndiotactic polypropylene. This polypropylene can have a density of from about 0.89 to about 0.91 g/cc, with the largely isotactic polypropylene having a density of from about 0.90 to about 0.91 g/cc. Also, high and ultra-high molecular weight polypropylene that has a fractional melt flow rate can be employed. In one or more embodiments, polypropylene resins may be characterized by a MFR (ASTM D-1238; 2.16 kg @230° C.) that is less than or equal to 10 dg/min, or less than or equal to 1.0 dg/min, or less than or equal to 0.5 dg/min.

In one or more embodiments, the thermoplastic phase includes, in addition to a polypropylene resin, a polyethylene resin. In one or more embodiments, this polyethylene resin includes at least 90%, or at least 95%, or at least 99% of the polymeric units derive from ethylene. In one or more embodiments, this polyethylene resin is a polyethylene homopolymer.

In one or more embodiments, the polyethylene used in conjunction with the polypropylene may be characterized by having a weight average molecular weight of from about 100 to 250 kg/mole, or from about 110 to 220 kg/mole, or from about 150 to 200 kg/mole. This polyethylene may be characterized by having a polydispersity that is less than 12, or less than 11, or less than 10, or less than 9.

In one or more embodiments, the polyethylene used in conjunction with the polypropylene may be characterized by having a melt index from 1.2 to 12 dg/min, or from 0.4 to 10 dg/min, or from 0.5 to 8.0 dg/min, per ASTM D-1238 at 190° C. and 2.16 kg load.

In one or more embodiments, the polyethylene used in conjunction with the polypropylene may be characterized by an intrinsic viscosity as determined per ASTM D 1601 and D 4020 that is from 0.5 to 10 dl/g, or from 1.0 to 9.0 dl/g, or from 1.5 to 8.0 dl/g.

In one or more embodiments, the polyethylene used in conjunction with the polypropylene resin may be characterized by a density as measured per ASTM D4883 that is greater than 0.93 g/cc, or greater than 0.94 g/cc, or greater than 0.95 g/cc.

Polymers useful as the polyethylene used in conjunction with the polypropylene may be generally referred to as high density polyethylene resins. For example, useful high density polyethylene resins include those available under the tradename HDPE HD7960.13, commercially available from ExxonMobil Chemical Co.

Generally, the thermoplastic phase comprises from 5 to 75 wt %, such as from 7 to 60 wt %, such as from 10 to 55 wt % of the total weight of the thermoplastic vulcanizate composition.

Additional Additives

The thermoplastic vulcanizate composition describe herein may include any or all of the optional additives conventionally included in thermoplastic elastomer compositions.

Fillers that may optionally be included include those reinforcing and non-reinforcing fillers or extenders that are conventionally employed in the compounding of polymeric materials. Useful fillers include carbon black, calcium carbonate, clays, silica, talc, and titanium dioxide.

Plasticizers, extender oils, synthetic processing oils, or a combination thereof may also be optionally added to the blend. The extender oils may include, but are not limited to, aromatic, naphthenic, and paraffinic oils. Exemplary synthetic processing oils are polylinear α-olefins, polybranched α-olefins, and hydrogenated polyalphaolefins.

Oligomeric extenders may also optionally be used. Preferred oligomeric extenders include copolymers of isobutylene and butene or copolymers of butadiene together with a complementary comonomer. These oligomeric extenders typically have a number average molecular weight of less than 1,000 g/mol. Useful oligomeric extenders are commercially available. For example, oligomeric copolymers of isobutylene and butene are available under the tradenames Polybutene™, commercially available from Soltex; Indopol™, commercially available from BP; and Parapol™, commercially available from ExxonMobil Chemical Co. Oligomeric copolymers including butadiene are commercially available under the tradename Ricon Resin™, commercially available from Ricon Resins, Inc.

Polymeric processing additives may also optionally be added. These processing additives may include polymeric resins that have a very high melt flow index. These polymeric resins include both linear and branched molecules that have a melt flow rate that is greater than about 500 dg/min, or greater than about 750 dg/min, or greater than about 1000 dg/min, or greater than about 1200 dg/min, or greater than about 1500 dg/min. Mixtures of various branched or various linear polymeric processing additives, as well as mixtures of both linear and branched polymeric processing additives may be used. The preferred linear polymeric processing additives are polypropylene homopolymers. The preferred branched polymeric processing additives include diene-modified polypropylene polymers. Thermoplastic vulcanizates that include similar processing additives are disclosed in U.S. Pat. No. 6,451,915, which is incorporated herein by reference.

In addition, to the known additives discussed above, in some embodiments the TPV compositions described herein may include an epoxidized soy bean oil, an alkyl radical scavenger, an alkyl phosphite and/or a non-basic hindered amine light stabilizer. The use of these particular additives will be discussed in more detail below.

Producing the Thermoplastic Vulcanizates (TPV)

The TPV compositions described herein are produced by supplying the cross-linkable rubber, the thermoplastic polymer, the phenolic resin curing agent, and optionally any additives to a mixer, such as screw extruder. The components are then mixed under conditions such that the thermoplastic polymer melts and the rubber is at least partially crosslinked, to produce a heterogeneous product comprising particles of the at least partially crosslinked rubber dispersed in a matrix comprising the thermoplastic polymer. Suitable conditions for conducting the mixture include a temperature from 170 to 250° C., such as from 190 to 230° C.

Methods to Improve UV Stability of TPVs (A) Adding Epoxidized Soy Bean Oil

In some embodiments, an epoxidized soy bean oil is added to the mixer used to produce the TPV after at least partial curing of the rubber phase. As used herein, the term "epoxidized soy bean oil" refers to the product obtained by reacting the double bonds of the oil with a peroxyacid, generally peroxyacetic or peroxyformic acid, generated in situ by reacting concentrated hydrogen peroxide with acetic or formic acid in the presence of a mineral acid as catalyst.

The amount of epoxidized soy bean oil added to the mixture of thermoplastic phase and cured rubber phase is not critical but suitable amounts are generally from about 5 wt % to about 70 wt %, based on the total weight of the phenolic resin and epoxidized soybean oil in the composition.

The addition of the epoxidized soy bean oil to the mixture of thermoplastic phase and cured rubber phase is found to improve the UV stability of the final TPV product. Although the reason for this improvement is not understood, the inventors believe that the acidic decomposition products of the phenolic resin curative is soluble in the paraffinic oil present in the TPV. Hence an oil-soluble neutralizer for the phenolic resin, such as epoxidized soy bean oil, is effective in reducing the detrimental effects of the phenolic antioxidant on product UV resistance.

(B) Adding an Alkyl Radical Scavenger and Alkyl Phosphite

In some embodiments, both an alkyl radical scavenger and alkyl phosphite are added to the mixer used to produce the TPV during, preferably at or the beginning of, melt blending the thermoplastic phase and the rubber phase. Stated differently, the alkyl radical scavenger and alkyl phosphite are preferably added to the mixer prior to the curing of the rubber phase.

The "alkyl radical scavenger" is a compound selected from hydroxyl amine, hydroxyl amine-containing compounds, lactone, lactone-containing compounds, chromanol, and chromanol-containing compounds. More preferably, the alkyl radical scavenger is selected from 6-chromanol-containing compounds; most preferably, tocopherol and derivatives thereof (e.g., alpha, beta, gamma, delta, and $C_{10}$ to $C_{26}$ side chain). Most preferably, the alkyl radical scavenger is selected from 6-chromanol containing compounds. A highly desirable compound is selected from tocopherol and derivatives thereof (e.g., alpha, beta, gamma, delta, and $C_{10}$ to $C_{26}$ side chain). For example, desirable 6-chromanol-containing compounds can comprise compounds of formula (I):

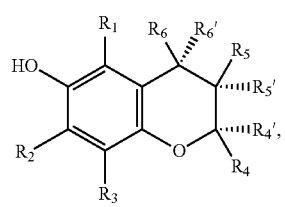

(I)

wherein each of R1, R2, R3 and R6/R6' are independently selected from hydrogen and $C_1$ to $C_{10}$ linear alkyls or branched alkyls, most preferably hydrogen and $C_1$ to $C_5$ linear and branched alkyls, and even more preferably, selected from hydrogen and methyl groups; and each of R4 and R5 (and R4' and R5') are independently selected from hydrogen and $C_1$ to $C_{30}$ linear or branched alkyls; even more preferably, either one of R4 or R5 (and R4' and R5') are independently selected from $C_8$ to $C_{24}$ branched alkyls, and most preferably either one of R4 or R5 (and R4' and R5') are independently selected from $C_{10}$ to $C_{20}$ branched alkyls, wherein the other of R4 or R5 is hydrogen. For instance, each of R1, R2 and R3 may be methyl groups, while R5 and R6 are hydrogens, and R4 is a branched $C_{16}$ group, such as the case with α-tocopherol. The stereochemistry at the R4 carbon is not important and can be a mixture of chiral centers. The "branching" can be any alkyl group, preferably methyl groups, on at least one carbon along the main carbon chain. A most preferable alkyl radical scavenger is dl-α-tocopherol and its salts and derivatives.

The amount of the alkyl radical scavenger and alkyl phosphite added to the mixture of thermoplastic phase and rubber phase is generally from about 0.005 wt % to about 0.05 wt % parts of alkyl radical scavenger, based on the total weight of the composition and from about 0.05 wt % to about 0.5 wt % of an alkyl phosphite, based on the total weight of the composition. Aromatic phosphites, such as Irgafos 168 commercially available from BASF, are also suitable for use in the present invention.

Adding the combination of an alkyl radical scavenger and alkyl phosphite during melt blending has been found to improve the UV stability of the final TPV, particularly when the thermoplastic phase comprises polypropylene (PP). Without wishing to be bound by theory, it has been found that shear degradation of PP during TPV production and subsequent fabrication (by injection molding, for example) results in the oxidation of the PP. This results in poor product UV resistance and variability in UV resistance, as the ingress of oxygen into molten TPV is uncontrolled. Presumably, under oxygen starved conditions that exists in an extruder, the alkyl radical scavenger can better compete with oxygen in quenching the initially formed carbon centered radicals with hydrogen, thus limiting PP oxidation, thereby improving product UV resistance. The presence of alkyl phosphite is believed to decompose any hydroperoxides formed, so that the alkyl radical scavenger is not consumed delivering hydrogen atoms to oxygen centered radicals, which, of course, results in oxidized polymer. The use of the fast acting alkyl phosphite conserves the alkyl radical scavenger for hydrogen atom transfer to carbon centered PP radicals.

(C) Adding Non-Basic Hindered Amine Light Stabilizer

Hindered amine light stabilizers (HALS) were developed to protect polyolefins from UV radiation. It has been established that PP degradation is the major contributor to UV degradation of phenolic resin cured PP/EPDM TPVs. However, HALS have been shown not to be useful in the UV protection of TPVs because the acidic phenolic resin curative residues in TPVs neutralizes the basic HALS. It has now been found that certain non-basic HALS are effective in improving the UV stability of TPVs, in which the thermoplastic phase comprises at least about 7 wt %, preferably at least about 10 wt %, of a polypropylene (based on the total weight of the thermoplastic phase), where the polypropylene has a heat of fusion greater than 80 J/g, and preferably greater than 90 J/g. As used herein, heat of fusion values ($2^{nd}$ heat) are determined according to Differential Scanning Calorimetry ASTM E-1356 at a heating/cooling rate of 10° C./min.

Suitable non-basic HALS are N-acetyl HALS compounds, such as N(N'-acetyl-2,2,6,6-tetramethyl-4-piperidinyl)-3-dodecylsuccinimide, which is commercially available under the trade name Hostavin 3058, commercially available from Clariant. The amount of non-basic HALS added to the mixture of thermoplastic phase and rubber phase is not critical but suitable amounts are generally from about 1 wt % to about 5 wt %, based on the total weight of the TPV. The non-basic HALS is typically added after curing of the rubber phase.

EXAMPLES

The invention will now be more particularly described with reference to the following non-limiting Examples and the accompanying drawings.

The materials used in the examples of the invention are described in Table 1 below.

TABLE 1

| Material | Description |
|---|---|
| | Elastomers |
| VX1696 | EP(VNB)DM commercially available from ExxonMobil Chemical Co. Composed of 63 wt % of ethylene, 35.6 wt % of propylene, and 1.4 wt % of copolymerized vinylnorbornene (VNB), with 0.7 wt % of the bound VNB available for cure, the remainder being lost to branching of the rubber molecules. $M_w$ = 950, $M_n$ = 120 kg/mol, IV = 5 dl/g (decalin). VX1696 contains 100 parts of Paramount 6001 paraffinic oil (Group II) per 100 parts of dry rubber. $M_L(1 + 4\ @\ 125°\ C.)$ = 52. |
| V3666 | EP(ENB)DM commercially available ExxonMobil Chemical Co. Composed of 64 wt % of ethylene (based on copolymerized ethylene and propylene only) and 3.5 wt % of ethylidenenorbornene (ENB, based on total rubber mass). $M_w$ = 850, $M_n$ = 170 kg/mol, IV = 4 dl/g (decalin). V3666 contains 75 parts of Paramount 6001 paraffinic oil (Group II) per 100 parts of dry rubber. $M_L(1 + 4\ @\ 125°\ C.)$ = 52. |
| Kraton G1633ES | Commercially available SEBS from Kraton Polymers. High MW SEBS crumb (no flow) composed of 30 wt % polystyrene end blocks in a styrene/ethylene-butene-1/styrene triblock copolymer, with high copolymerized butane-1 content in rubbery mid-block (for enhanced compatibility with polypropylene). |
| | Plastic Materials |
| PP 5341 | Commercially available from ExxonMobil Chemical Co. Ziegler-Natta high MW isotactic polypropylene homopolymer. 0.8 MFR (230° C., 2.16 kg). |
| PP 1572 | Commercially available from ExxonMobil Chemical Co. Ziegler-Natta isotactic polypropylene homopolymer. 2 MFR (230° C.). |
| HP556E: | Commercially available from LyondellBasell. Ziegler-Natta high MW isotactic polypropylene homopolymer. 0.8 MFR (230° C., 2.16 kg). |
| MR2002 | Commercially available from LyondellBasell. Metallocene isotactic polypropylene homopolymer. 15 MFR (230° C., 2.16 kg). |
| MF650Y | Commercially available from LyondellBasell. Metallocene isotactic polypropylene homopolymer. 1800 MFR (230° C., 2.16 kg). |
| HA801U | Commercially available from LyondellBasell. Ziegler-Natta high crystallinity isotactic polypropylene homopolymer. 65 MFR (230° C., 2.16 kg) |
| HA802H | Commercially available from LyondellBasell. Ziegler-Natta high crystallinity isotactic polypropylene homopolymer. 2.3 MFR (230° C., 2.16 kg) |
| M3283WZ | Commercially available from Total. Metallocene isotactic polypropylene homopolymer. 2 MFR (230° C., 2.16 kg). |
| F008F | Commercially available from Braskem. Ziegler-Natta high MW isotactic polypropylene homopolymer. 0.8 MFR (230° C., 2.16 kg). |
| F1000HC | Commercially available from Braskem. Ziegler-Natta high crystallinity isotactic polypropylene homopolymer. 115 MFR (230° C., 2.16 kg). |
| | Paraffinic Oils |
| Paramount 6001 | Commercially available from Chevron. Group II paraffinic oil. |
| Paramount 2401 | Commercially available from Chevron. Group II paraffinic oil (low MW). |
| | Elastomeric Curatives |
| Andisyl XL 203-44 | Commercially available from AB Specialty Silicones. It is a trimethylsilyl terminated dimethylsiloxane-co-methylhydrogensiloxane silicone hydride. SiH 10.87 mmol/g, 20 cSt @ room temperature (23° C.) |
| PC085 | Commercially available from UCT Specialties. It is a 2.2 wt % Pt° in D4 cyclic methylvinylsiloxanes. Diluted to 0.22 wt % of concentrate in Paramount 6001 oil for use. |
| HRJ16261 | Commercially available from SI Group. It is a 30 wt % resole type phenolic resin, produced in Paramount 2401 oil. |
| SnCl$_2$ Master Batch | Commercially available from PolyOne. It is a phenolic resin cure promoter and an anhydrous SnCl$_2$ (45 wt %, melt blended into PP 5341). |
| | Carbon Black Concentrates |
| LR225143 | Commercially available from Soltex. It is an acetylene black (35 nm primary particle size, 30 wt %) melt blended into a Ziegler-Natta isotactic polypropylene homopolymer, 12 MFR (230° C., 2.16 kg). |

TABLE 1-continued

| Material | Description |
| --- | --- |
| 49974 | Commercially available from Ampacet Corporation. It is a carbon black (19 nm primary particle size, 40 wt %) melt blended into a Ziegler-Natta isotactic polypropylene homopolymer, 35 MFR (230° C., 2.16 kg). |
| LR225142 | Commercially available from Ampacet. It is a carbon black (19 nm primary particle size, 30 wt %) melt blended into a Ziegler-Natta high crystallinity isotactic polypropylene homopolymer, Braskem F1000HC, 115 MFR (230° C., 2.16 kg). |
| LR22819 | Commercially available from Ampacet. It is a carbon black (19 nm primary particle size, 40 wt %) melt blended into a metallocene isotactic polypropylene homopolymer, Total M3766, 24 MFR (230° C., 2.16 kg). |
| LR232295 | Ampacet. Carbon black (19 nm primary particle size, 40 wt %) melt blended into a isotactic poly(butane-1) homopolymer, LyondellBasell PB0300M, 4 MI (190° C., 2.16 kg). |
| Plasblak 6331 | Commercially available from Cabot Corporation. It consists of carbon black (19 nm primary particle size, 40 wt %) melt blended into a Ziegler-Natta isotactic polypropylene homopolymer (12 MFR (230° C., 2.16 kg), commercially available from Borealis under the tradename HE125MO). |
| | Fillers |
| IceCap K Clay | Commercially available from Burgess. It is a calcined aluminum silicate (1.5 μm average particle size (Sedigraph)). |
| Jetfil 625C | Commercially available from Imerys. |
| | UV Stabilizing Additives |
| Epoxidized Soybean oil | Commercially available from Baerlocher. |
| Vitamin E (alkyl radical scavenger) | Commercially available from BASF. |
| LGP-11 | Commercially available from Dover Chemical. It is a hydrolytically stable, alkyl phosphite polyolefin melt processing stabilizer. |
| Hostavin 3058 | Commercially available from Clariant. It is a N-Acetyl HALS. N-(N'-Acetyl-2,2,6,6-tetramethylpiperidin-4-yl)-3-dodecyl-2,5-pyrrolidindione. |
| | Antioxidants |
| Irganox 1076 | Commercially available from BASF. It is a phenolic Antioxidant. |
| Irgafos 168 | Commercially available from BASF. It is phosphite melt processing stabilizer. |
| S8000 slurry | Mixture of Irganox 1010 (commercially available from BASF; a phenolic anti-oxidant) and Irgafos 168, and is slurried in Paramount 6001 Group II paraffinic oil. |

Preparation and Molding of PP/EPDM TPVs

The PP/EPDM TPVs in the examples of this invention were reactively compounded (at 50 to 90 kg/hr) in a 15 barrel, 53 mm, 3-lobe-counter-rotating twin screw extruder, with a length to diameter ratio of 46.7. Granulated rubber (VX1696 for hydrosilylation cure; V3666B for phenolic resin cure) partitioned with clay containing ZnO (acid neutralizer), PP, and PP based master batches were fed into the feed throat of the extruder. Oil, in addition to the oil already present in the rubber, ("upstream" oil) was injected into the second barrel of the extruder, and an intimate melt blend of the added materials was produced by intensive mixing, assisted by shear heating and heat flow to materials from the heated barrels of the extruder. For hydrosilylation cure, the liquid silicone hydride curative was then injected into the 3$^{rd}$ barrel. Further downstream, a vacuum vent removed moisture from the melt prior to adding the Pt catalyst solution. The oil-swollen rubber phase then converted to oil-swollen, cross-linked particulate rubber, due to rubber curing at high temperature, under intense polymer melt blending. Thus, a solution of PPs in oil that is filled with oil-swollen particulate rubber was formed.

After kneading in the curing zone of the extruder, the melt was vacuum-vented again, followed by additional paraffinic oil ("downstream" oil) being mixed into the polymer melt. Upon cooling, the PPs crystallized to produce a TPV best described as oil-swollen, cross-linked (1-5 μm in diameter) particulate rubber that is contained in a continuous PP matrix that is swollen with sub-micron pools of oil. The melt was pelletized in an underwater pelletizer, dried, and injection molded into plaques of the size 6"×4"×0.07". Molding was conducted on a 200 ton Van Dorn injection molding machine. The polymer melt temperature was about 204° C. The mold employed had a "fan" gate, with one side of the mold water cooled to about 49° C., and the other side to about 38° C., to assist in plaque removal from the vertical mold. Mold fill time was about 1 second, with a cycle time of 30 seconds.

The barrel where each raw material was introduced is identified in the Tables below. Liquids are fed either "under", in the "middle", or at the "downstream" position of the barrel indicated. For example, Vitamin E (the alkyl radical scavenger) and LGP-11 are dissolved in, and fed (pre-cure) in the "upstream" oil. Hostavin 3058 is dissolved in, and fed (post-cure) in the "downstream" oil. All formulations in the Tables are based on 100 parts ("phr") of oil-free rubber. For example, V3666B is listed as 175, indicating that 75 parts of oil is present in this material.

UV Resistance Testing of Black Colored PP/EPDM TPVs

PP/EPDM TPVs were black colored from surface exposure from UV. For weathering testing, a plaque was cut into half along the 6" length, and each piece was cut into three equal pieces to produce 6 test samples per plaque. Three plaques of each formulation were tested, resulting in 18 (2"×2") test pieces per formulation. This protocol was deemed necessary as there is expected to be considerable variation in weathering results due to variation in surface composition of the plaques. The plaque surface and sub-surface consists of PP, sub-micron pools of oil containing dissolved decomposed phenolic resin curative residues (in the phenolic resin cured sample), and particulate rubber, where most of the carbon black UV absorber is included just inside the surface of the rubber particle, while some of the carbon black particles are in the PP phase. Also on the plaque surface are particulate clay, ZnO, unreacted $SnCl_2$, and by-products of the reaction of $SnCl_2$ with phenolic resin. Uneven material distribution across the plaque surface will result in plaque position dependent weathering performance. In all cases, the plaque test surface was opposite the plaque side bearing cross-hair marks (embedded for shrinkage measurements).

Alternatively, for weathering testing, a 2"×2" test piece was isolated from the center of a plaque. Six plaques were die-cut to generate six test pieces per sample. Once again, the side of the plaque that was opposite the "cold" side of the mold (100° F., marked with shrinkage measurement cross-hairs) was weather tested.

Weathering tests were conducted in an indoor weather-o-meter as per the VW 3929 automotive specification ("Kalahari" test) for 1500 hr. Color change (dL=grey scale, db=yellow scale) after weathering was determined on a 45°/0° Hunter Color Instrument in the specular excluded mode (10° observer). Gloss change was measured at 60° and 85°. Testing was conducted on a circular area of 1" diameter in the center of the 2"×2" test specimen, before and after weathering. The lower the color change after weathering, the better the product UV resistance.

The "chaking" test is a qualitative visual estimation of the extent of surface degradation of a UV exposed test speci-men. "Chalk" refers to a visual estimate of the relative amount of material adhering to a piece of transparent adhesive tape after application to, and subsequent removal from a weathered test plaque. A "chalk" value of 10 indicates that no material was removed from the weathered plaque by the tape. The higher the chalk, the better the sample weathering resistance.

Although automotive specifications require documentation of gloss change after weathering of TPVs as measured at 60°, for low gloss samples, as in the case of this work, gloss change measured at 85° is much more sensitive to surface roughness change after weathering. Hence gloss change at both angles is reported in this work.

Examples 1 and 2. Tables 2 and 3 below demonstrate the adverse effect of decomposed phenolic resin on TPV weathering resistance.

TABLE 2

| Run. No. Raw Material | Barrel No./Position | Example 1 PHR | Example 2 PHR |
|---|---|---|---|
| VX1696 Rubber | 1 | 200 | 0 |
| Icecap K Clay | 1 | 40 | 42 |
| Zoco 102 Zinc Oxide | 1 | 2 | 1.5 |
| V 3666B Rubber | 1 | 0 | 175 |
| SnCl$_2$ Masterbatch | 1 | 0 | 1.7 |
| PP5341 | 1 | 37 | 50.2 |
| LR-225143 | 1 | 40 | 0 |
| Ampacet 49974 | 1 | 0 | 25.6 |
| Andisil XL203-44 | 3Under | 2 | 0 |

TABLE 2-continued

| Run. No. Raw Material | Barrel No./Position | Example 1 PHR | Example 2 PHR |
|---|---|---|---|
| Pt Catalyst Solution (0.22%) | 8Middle | 3 | 0 |
| HRJ 16261 | 8Middle | 0 | 12.8 |
| S8000 Irganox Slurry | 12Middle | 13.5 | 0 |
| Paramount 6001 Oil #1 | 2Middle | 0 | 5.6 |
| Paramount 6001 Oil #2 | 11Middle | 0 | 44.9 |
| Paralux 6001R Oil #1 | 2Downstream | 10 | 0 |
| Paralux 6001R Oil #2 | 10Downstream | 15 | 0 |
| Total | | 362.5 | 359.28 |

Example 1 of Table 2 is a hydrosilylation cured PP/EPDM TPV. Example 2 of Table 2 is a phenolic resin cured TPV. Examples 1 and 2 have similar plastic, rubber, paraffinic oil, and carbon black content, as indicated by the amount and type noted in Table 2 above. An EP(VNB)DM rubber (VX1696, inert to phenolic resin) was used for hydrosilylation cure, and an EP(ENB)DM rubber (V3666B, inert to hydrosilylation cure) was used for phenolic resin cure. An acetylene black of 35 nm primary particle size was the pigment for the hydrosilylation cured TPV, as a conventional furnace carbon black contains impurities that would poison the low level of Pt used as the hydrosilylation catalyst. For the phenolic resin cured TPV of Example 2, a carbon black with 19 nm primary particle size (known to be a much more effective UV absorber than the 35 nm primary particle size acetylene black) was used.

The phenolic resin cured product of Example 2 was molded (Runs 1 & 2) under conditions similar to that for the molding of the hydrosilylation cured product of Example 2. The change in the gray scale on weathering (18 test pieces), as illustrated graphically in FIG. 1, clearly demonstrates the adverse effect of the phenolic resin curative on weathering (diamonds, Example 1; squares, Example 2, Run 1; triangles, Example 2, Run 2). The lower the dL value, the better the weathering resistance. It is believed that increased surface oxidation during molding is responsible for the poorer weathering performance of the material of Example 2, when molded under different conditions (Run 2 was poorer in weathering performance in comparison to Run 1). The observed color change results were confirmed by the "chalk" and gloss change results of Table 3 below.

TABLE 3

| Kalahari 1500 hr Change (18 test pieces per sample) | | | |
|---|---|---|---|
| Sample | Chalk | dG60° | dG85° |
| Example 1 of Table 2 | 9 | 0 | 5 |
| Example 2 of Table 2 (Run 1) | 8 | 0 | 8 |
| Example 2 of Table 2 (Run 2) | 7 | 1 | 9 |

Examples 3 to 5. Three similar styrene-ethylene-butylene-styrene (SEBS) compounds were produced by melt blending Kraton G1633ES (high MW SEBS crumb containing 30 wt % polystyrene end blocks in a styrene/ethylene-butene-1/styrene triblock copolymer) with PP5341 and oil according to the formulations shown in Table 4. All of the oil was initially absorbed, at room temperature (about 23° C.), into the SEBS crumb, by tumbling in a drum. After standing overnight at room temperature (about 23° C.), the oil-extended SEBS was still a free-flowing powder. It is believed that this oil extension allows reduction in the shear degradation of the high MW SEBS during melt compounding with PP. To investigate the effect on weathering resistance of the presence of oil-soluble decomposed phenolic resin curative, phenolic resin (HRJ16261)/SnCl$_2$ was added to the formulation of Example 4, phenolic resin alone was added to the formulation of Example 5, and no curative was included in the formulation of Example 3.

TABLE 4

| Run. No.<br>Raw Material | Barrel No. | Example 3<br>PHR | Example 4<br>PHR | Example 5<br>PHR |
|---|---|---|---|---|
| Kraton G1633ES | 1 | 100 | 100 | 100 |
| Paramount 6001 Oil | 1 | 135 | 135 | 135 |
| Icecap K Clay | 1 | 42 | 42 | 42 |
| Zoco 102 Zinc Oxide | 1 | 1.5 | 1.5 | 1.5 |
| Irganox 1076 | 1 | 0.4 | 0 | 0 |
| Irgafos 168 | 1 | 0.3 | 0 | 0 |
| PP5341 | 1 | 51 | 51 | 51 |
| Plasblak PP6331 | 1 | 25 | 25 | 25 |
| SnCl$_2$ Masterbatch | 1 | 0 | 1.7 | 0 |
| HRJ 16261 | 6Middle | 0 | 12.8 | 12.8 |
| Total | | 355.2 | 369.0 | 367.3 |

Figure 2:
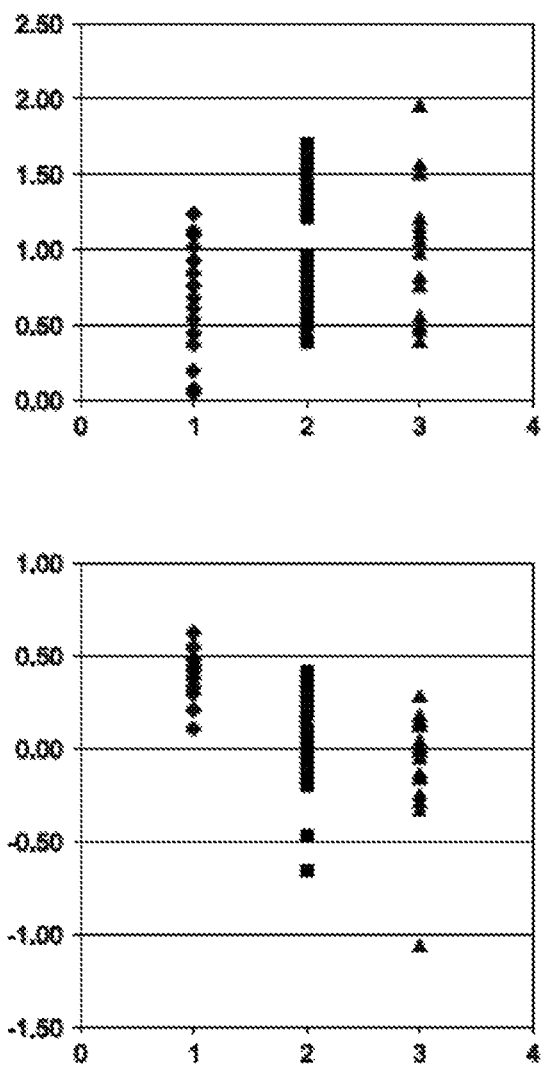
FIG. 2 shows the results of weathering testing of TPVs of Examples 3-5.

The results of weathering tests as described above on the products of Table 3 are shown in FIG. 2 and Table 5. Since SEBS is a non-functional rubber, there should be no reaction with phenolic resin (HRJ16261)/SnCl$_2$ (Example 4) or phenolic resin alone (Example 5). Also, the morphology of the SEBS compound would be thus be unchanged by the addition of phenolic resin. However, the dL value of FIG. 2 (Example 3, diamonds; Example 4, squares; Example 5, triangles; 18 test replicates per sample) and "Chalk" values of Table 5 substantiate the previous conclusion that the phenolic resin curative decreases TPV weathering performance Table 5 also lists visual appearance of the weathered samples relative to an UV unexposed control (5=appearance similar to UV unexposed control, with lower #s indicating progressively larger appearance differences for the UV exposed test sample, in comparison with the UV unexposed control). It was seen that both the phenolic resin-containing products of Examples 4 and 5 show increased UV degradation versus the resin-free product of Example 3.

TABLE 5

| Kalahari 1500 hr Change (18 test pieces per sample) | | | | |
|---|---|---|---|---|
| Sample | Chalk | dG60° | dG85° | Visual |
| Example 3 of Table 4 | 10 | 0 | 10 | 4 to 5 |
| Example 4 of Table 4 | 7 | −3 | −9 | 4 |
| Example 5 of Table 4 | 8 | −3 | −14 | 4 |

UV Resistance Improvement of Extrusion Grade Phenolic Resin-Cured TPVs by Post-Cure Addition of Epoxidized Soybean Oil Examples 6 and 7. In Example 7 of Table 6 below, epoxidized soybean oil was added post-cure to the phenolic resin cured control TPV of Example 6.

TABLE 6

| Run. No.<br>Raw Material | Barrel No. | Example 6<br>PHR | Example 7<br>PHR |
|---|---|---|---|
| V 3666B Rubber<br>(Paramount 6001R) | 1 | 175 | 175 |
| Icecap K Clay | 1 | 42 | 42 |
| Zoco 102 Zinc Oxide | 1 | 1.5 | 1.5 |
| SnCl$_2$ Masterbatch | 1 | 1.7 | 1.7 |
| Braskem PP F008F | 1 | 51.8 | 51.8 |
| Cabot PP6331 Black MB | 1 | 23 | 23 |
| Epoxy Soybean Oil | 10Downstream | 0 | 4 |
| HRJ 16261 | 8Middle | 12.8 | 12.8 |
| Paralux 6001R Oil #1 | 2Middle | 5.6 | 5.6 |
| Paralux 6001R Oil #2 | 11Middle | 44.9 | 44.9 |
| Total | | 358.2 | 362.2 |

Figure 3:
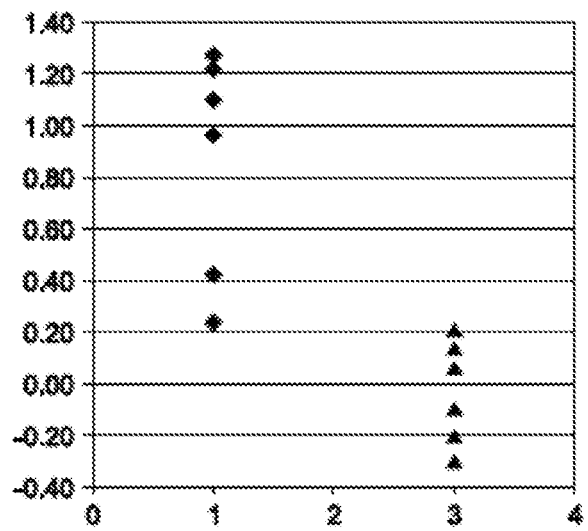
FIG. 3 shows the results of weathering testing of TPVs of Examples 6-7.
Figure 3:
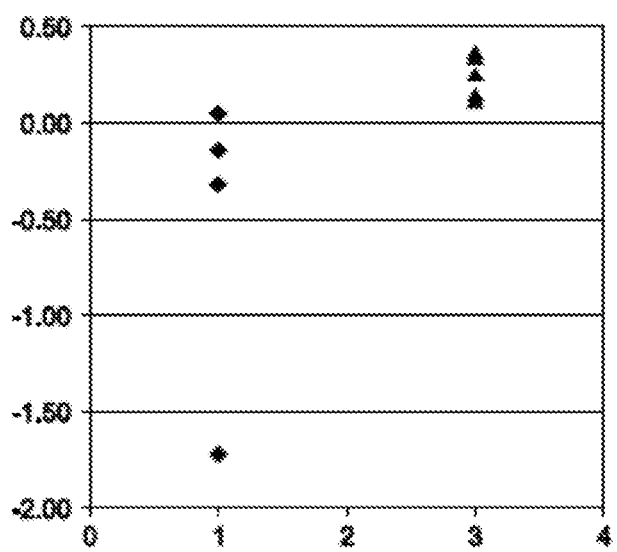

The results of weathering tests on the products of Table 6 are shown in FIG. 3 and Table 7, and demonstrate that when the phenolic resin was neutralized with epoxidized soy oil after completion of cure (Example 7), product weathering resistance improved as per the dL value of FIG. 3 (diamonds, Example 6; triangles, Example 7; 6 test replicates per sample) and the "Chalk" data of Table 7 below.

TABLE 7

| Sample | Chalk | Visual |
|---|---|---|
| Example 6 of Table 6 | 7 | 4 |
| Example 7 of Table 6 | 8 | 4 to 5 |

UV Resistance Improvement by Extrusion Grade Phenolic Resin Cured TPVs by Pre-Cure Addition of an Alkyl Radical Scavenger/Alkyl Phosphite Examples 8 and 9. Two phenolic resin cured PP/EPDM TPVs similar to those of Examples 6 and 7 were produced but in one case (Example 9) small amounts of Vitamin E (the alkyl radical scavenger) dissolved in oil and a liquid polymeric alkyl phosphite stabilizer (Doverphos LGP-11) dissolved in oil were added to the extruder during the beginning of the melt blending of the EPDM rubber and the solid PP pellets. In the case of the control, Example 8, no alkyl radical scavenger/alkyl phosphite stabilizer were added.

TABLE 8

| Run. No.<br>Raw Material | Barrel No. | Example 8<br>PHR | Example 9<br>PHR |
|---|---|---|---|
| V 3666B Rubber<br>(Paramount 6001R) | 1 | 175 | 175 |
| Icecap K Clay | 1 | 42 | 42 |
| Zoco 102 Zinc Oxide | 1 | 1.5 | 1.5 |
| Poly One SnCl$_2$ MB | 1 | 1.7 | 1.7 |
| Braskem PP F008F | 1 | 51.8 | 51.8 |
| Cabot PP6331 Black MB | 1 | 23 | 23 |
| Vitamin E (dissolved in oil) | 2Middle | 0 | 0.05 |
| Doverphos LGP-11 (in Oil#1) | 2Middle | 0 | 0.5 |
| HRJ 16261 RI0 | 8Middle | 12.8 | 12.8 |
| Paralux 6001R Oil #1 | 2Middle | 5.6 | 5.6 |
| Paralux 6001R Oil #2 | 11Middle | 44.9 | 44.9 |
| Total | | 358.2 | 358.8 |

Figure 4:
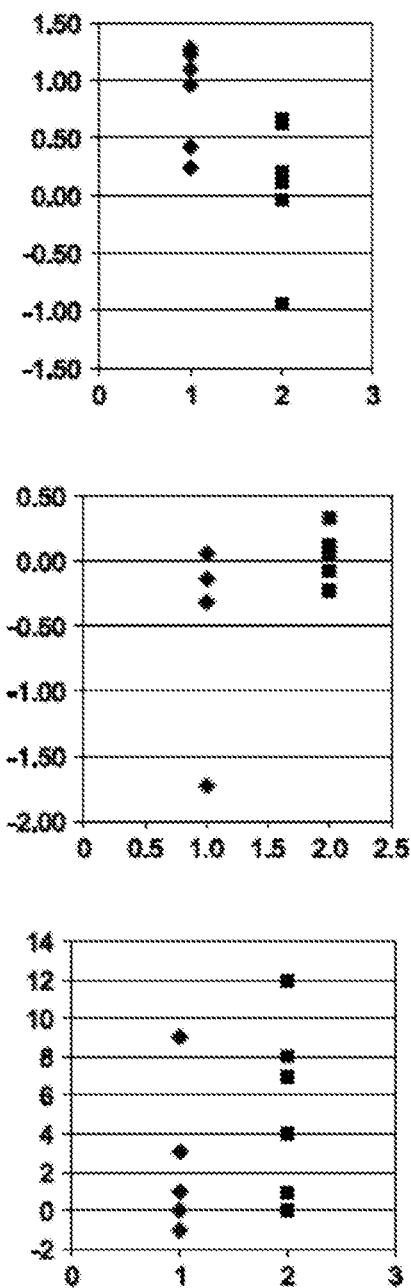
FIG. 4 shows the results of weathering testing of TPVs of Examples 8-9.

The results of weathering tests as on the products of Table 8 are shown in FIG. 4 and in Table 9 below. It will be seen from FIG. 4 that adding a small amount of alkyl radical scavenger/alkyl phosphite into the PP/EPDM/clay mix via oil that enters the extruder during the initial stages of the polymer melt blending process allows improvement in product UV resistance as illustrated in the lower dL values observed for the product of Example 9 (diamonds, Example 8; squares, Example 9; 6 test replicates per sample). As will be seen from Table 9, the product of Example 9 also has a visual appearance closer to the UV unexposed control.

TABLE 9

| Sample | Chalk | Visual |
| --- | --- | --- |
| Example 8 of Table 8 | 7 | 4 |
| Example 9 of Table 8 | 7 | 4 to 5 |

Examples 10 and 11. The TPV products of Table 8 were remade using PP 5341 to replace PPF008F used in Examples 8 and 9. The relative amounts of material in the resultant formulations are shown in Table 10.

TABLE 10

| Run. No.<br>Raw Material | Barrel No. | Example 10<br>PHR | Example 11<br>PHR |
| --- | --- | --- | --- |
| V 3666B Rubber<br>(Paramount 6001R) | 1 | 175 | 175 |
| Icecap K Clay | 1 | 42 | 42 |
| Zoco 102 Zinc Oxide | 1 | 1.5 | 1.5 |
| SnCl$_2$ Masterbatch | 1 | 1.7 | 1.7 |
| PP 5341 | 1 | 50.2 | 50.2 |
| Cabot PP6331 Black MB | 1 | 25.6 | 25.6 |
| Vitamin E (dissolved in oil) | 2Middle | 0 | 0.05 |
| Doverphos LGP-11 (in Oil#1) | 2Middle | 0 | 0.5 |
| HRJ 16261 RI0 | 8Middle | 12.8 | 12.8 |
| Paralux 6001R Oil #1 | 2Middle | 5.6 | 5.6 |
| Paralux 6001R Oil #2 | 11Middle | 44.9 | 44.9 |
| Total | | 359.3 | 359.8 |

Figure 5:
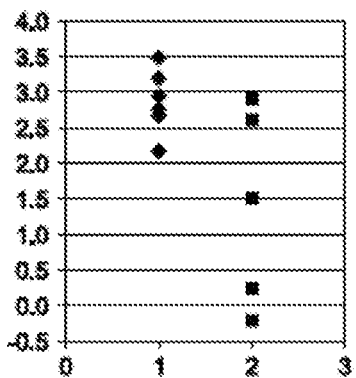
FIG. 5 shows the results of weathering testing of TPVs of Examples 10-11.
Figure 5:
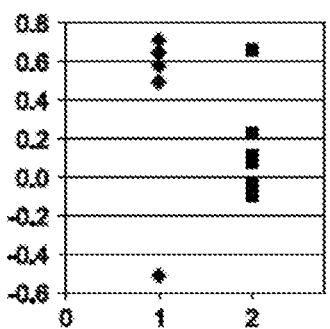
Figure 5:
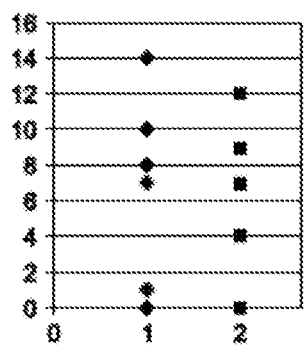

The results of weathering tests as described above on the products of Table 10 are shown in FIG. 5 (diamonds, Example 10; squares, Example 11; 6 test replicates per sample), and in Table 11. Once again, the inventive formulation of Example 11 employing the Vitamin E/LGP-11 combination exhibited improved weathering resistance, as compared with the control Example 10.

TABLE 11

| Sample | Chalk | Visual |
| --- | --- | --- |
| Example 10 of Table 10 | 7 | 4 to 5 |
| Example 11 of Table 10 | 10 | 4 to 5 |

Examples 12 and 13. The TPV products of Table 8 were remade but with the Braskem PP F008F used in Examples 8 and 9 replaced with a 2.3 MFR high crystallinity PP (LyondellBasell Adstif HA802H). Here isotactic polybutene-1 (PB0300M, 4 MI @190° C., 2.16 kg) is used as the carrier resin for carbon black (LP-232295). The relative amounts of material in the resultant formulations are shown in Table 12.

TABLE 12

| Run. No.<br>Raw Material | Barrel No. | Example 12<br>PHR | Example 13<br>PHR |
| --- | --- | --- | --- |
| V 3666B Rubber<br>(Paramount 6001R) | 1 | 175 | 175 |
| Icecap K Clay | 1 | 42 | 42 |
| Zoco 102 Zinc Oxide | 1 | 1.5 | 1.5 |
| Poly One SnCl$_2$ MB | 1 | 1.7 | 1.7 |

TABLE 12-continued

| Run. No.<br>Raw Material | Barrel No. | Example 12<br>PHR | Example 13<br>PHR |
| --- | --- | --- | --- |
| Lyondell Basell Adstif HA802H | 1 | 51.8 | 51.8 |
| LP-232295<br>(PB0300M/40 wt % CB) | 1 | 23 | 23 |
| Vitamin E<br>(dissolved in oil) | 2Middle | | 0.05 |
| Doverphos LGP-11<br>(in Oil #1) | 2Middle | | 0.5 |
| HRJ 16261 RI0 | 8Middle | 12.8 | 12.8 |
| Paralux 6001R Oil #1 | 2Middle | 5.6 | 5.6 |
| Paralux 6001R Oil #2 | 11Middle | 44.9 | 44.9 |
| Total | | 358.2 | 358.8 |

Figure 6:
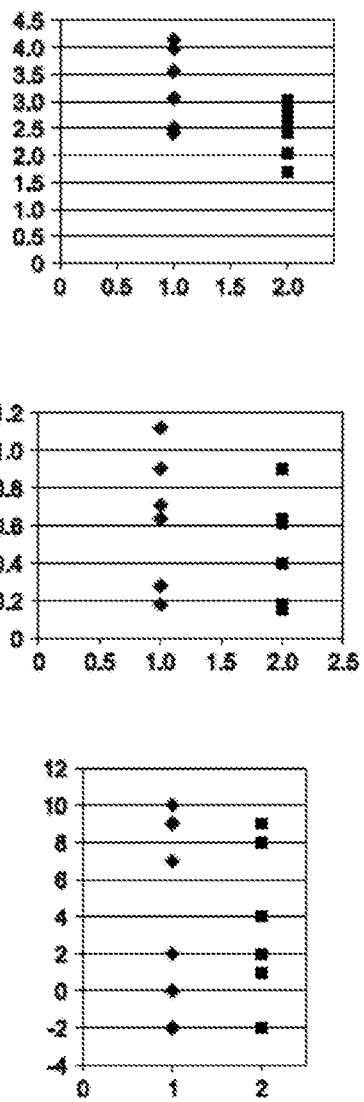
FIG. 6 shows the results of weathering testing of TPVs of Examples 12-13.

The results of weathering tests as described above on the products of Table 12 are shown in FIG. 6 (diamonds, Example 12; squares, Example 13; 6 test replicates per sample), and in Table 13. Again, the inventive formulation of Example 13 employing the Vitamin E/LGP-11 combination exhibited improved weathering resistance, as compared with the control Example 12.

TABLE 13

| Run | Chalk | Visual |
| --- | --- | --- |
| Example 12 of Table 11 | 7 | 4 to 5 |
| Example 13 of Table 11 | 7 | 4 |

UV Resistance Improvement by Injection Molding Grade Phenolic Resin Cured PP/EPDM TPVs by the Simultaneous Use of High Crystallinity PP and Post-Cure Added N-Acetyl HALS Examples 14 to 17. Thus far, this invention has been illustrated by the compounding and subsequent weathering of phenolic resin cured, extrusion grade TPVs. In Table 14, the utility of high crystallinity (tacticity) PPs, and the use of an N-Acetyl HALS in improving the weathering resistance of high melt flow injection moldable TPVs is illustrated. The control injection molding formulation of Example 14 contains a combination of low MFR (MR2002, 15 MFR) and high MFR (MF650Y, 1800 MFR) metallocene PP, in order to balance product physical properties offered by the low MFR PP, with ease of processability (high melt flow) due to the high MFR PP. It is known that the higher MFR PPs (low molecular weight) are less UV resistant than lower MFR PPs. Also, metallocene PPs (mPPs) have lower crystallinity than Ziegler-Natta (Z-N) PPs, and thus are less UV resistant than Z-N PPs, due to the presence of a larger amorphous phase in the former materials. mPPs have a lower low molecular weight atactic polymer content (about 1 wt % xylene soluble material) than Z-N PPs (3-4 wt % xylene soluble material), where lower xylene soluble material containing PP is expected to be more UV resistant than higher xylene soluble material containing PP.

The PP combination used to adjust melt flow in the standard formulation of Example 14 (MR2002 (15 MFR)/MF650Y (1800 MFR)) was replaced, in the inventive formulation of Example 17, with a single high crystallinity PP HA801U (65 MFR), with further product melt flow adjustment from the high crystallinity PP used to produce the black master batch (F1000HC (115 MFR), containing 35 wt % of carbon black with 19 nm primary particle size).

TABLE 14

| Run. No.<br>Raw Material | Barrel No. | Example 14<br>PHR | Example 15<br>PHR | Example 16<br>PHR | Example 17<br>PHR |
|---|---|---|---|---|---|
| V 3666B Rubber (Paramount 6001R) | 1 | 175 | 175 | 175 | 175 |
| Icecap K Clay | 1 | 30 | 30 | 30 | 30 |
| Zoco 102 Zinc Oxide | 1 | 1.9 | 1.9 | 1.9 | 1.9 |
| SnC12 MB (Pensacola) | 1 | 2.2 | 2.2 | 2.2 | 2.2 |
| Lumicene MR 2002 PP | 1 | 43 | 43 | | |
| MF650Y PP | 1 | 18 | 18 | | |
| Cabot PP6631 Black MB | 1 | 25 | 25 | | |
| LB HAU801UPP | 1 | 57 | 57 | | |
| F1000HCPP Black MB | 1 | 29 | 29 | | |
| Hostavin 3058 AO liquid | 12Middle | | 12 | 12 | |
| HRJ 16261 RIO | 5Downstream | 9.3 | 9.3 | 9.3 | 9.3 |
| Paralux 6001R Oil #1 | 2Downstream | 10 | 10 | 10 | 10 |
| Paralux 6001R Oil #2 | 10Downstream | 75 | 75 | 75 | 75 |
| Total | | 389.5 | 401.5 | 401.5 | 389.5 |

Figure 7:
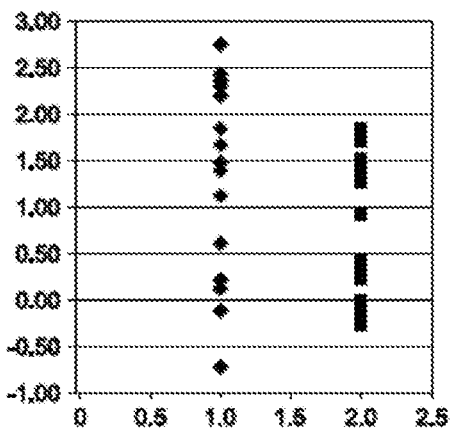
FIGS. 7-10 show the results of weathering testing of TPVs of Examples 14-17.
Figure 8:
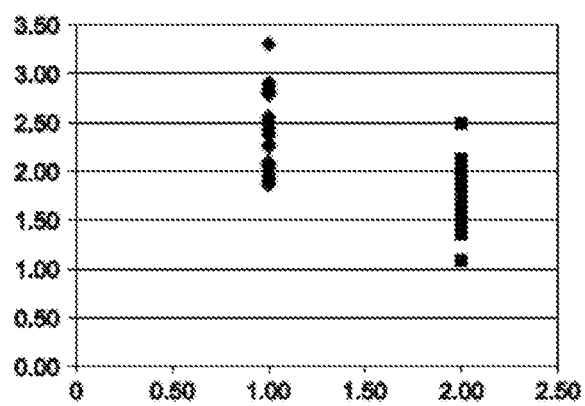

FIG. 7 shows that the UV resistance of the inventive formulation of Example 17 was also improved over that of the standard formulation. The change in grey scale (dL), on UV exposure was reduced for the formulation of Example 17 over the Example 14 control, presumably due to reduced surface micro-cracking of the UV exposed plaque. A black colored plaque would appear grey due to scattering of light by surface micro-cracks caused by UV exposure. Presumably, UV induced chain scission of amorphous PP tie molecules that connect PP crystallites, results in plaque surface cracking. Plaque "yellowing" on UV exposure (measured by db) is also reduced in the formulation of Example 17 over that of the Example 14 control (FIG. 8). The UV resistance data (18 test replicates per sample) is represented by diamonds (Example 14), and squares (Example 17), in FIGS. 7 and 8.

The heat of fusion (corresponding to crystallinity) of the polypropylenes used in the different formulations of Table 14 and elsewhere is listed in Table 15.

TABLE 15

| Polypropylenes | Heat of Fusion, Second Heat (J/g) |
|---|---|
| Total MR2002 (15 g/10 mm MFR metallocene) | 87.8 |
| LyondellBasell MF650Y (1800 g/10 mm MFR metallocene) | 93.4 |
| LyondellBasell HA801U (65 g/10 mm MFR high crystallinity Ziegler-Natta) | 108.7 |
| Braskem F1000HC (115 g/10 mm MFR high crystallinity Ziegler-Natta) | 115.8 |
| Braskem F008F (0.8 g/10 min MFR Ziegler-Natta) | 85.5 |

Figure 9:
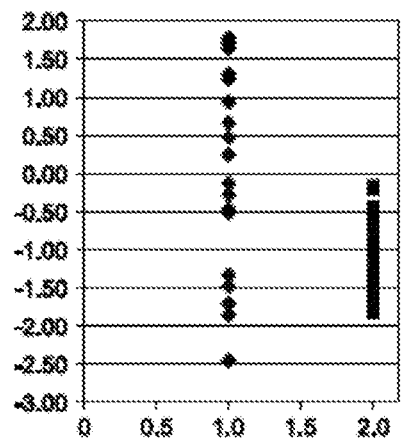
Figure 10:
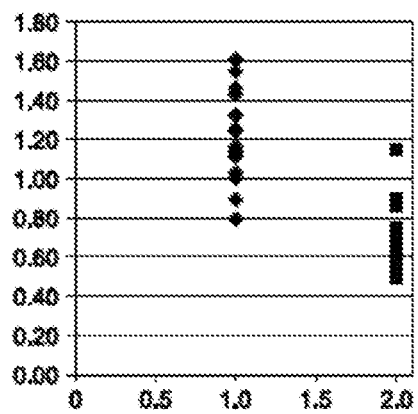

On reformulating both the control formulation of Example 14, and the inventive formulation of Example 17, with the addition of Hostavin 3058 (N-Acetyl HALS), the inventive formulation of Example 16 is much more UV resistant than the control formulation containing Hostavin 3058 (Example 15). This is apparent from FIGS. 9 and 10 (18 test replicates per sample; diamonds, Example 15; squares, Example 16). Several test specimens appear darker after UV aging in both formulations. This may be due to the non-uniform distribution of the sub-micron sized oil pools in the PP amorphous phase. Non-polar Paramount 6001 is expected to be distributed uniformly in the non-polar PP matrix of the TPV, but the presence of oil-soluble, polar Hostavin 3058, may have led to non-uniformly distributed, larger pools of oil. Hence the oil-free amorphous PP regions in TPV probably underwent deeper cracking than the oil-containing regions, resulting in a darker test piece appearance (due to exposed carbon black containing rubber particles that would absorb visible light), after UV aging, in the former areas than the latter.

In addition to UV resistance, the processability (melt flow) and fabricated product surface appearance (visual) of the injection molding formulation of Example 17 (Table 13) is further improved by the addition of N-Acetyl HALS, as per the spiral flow length data for Example 16. Flow length is measured by injection molding the TPV melt (at 200° C.) into a spiral die, in a procedure similar to that of U.S. Pat. No. 6,541,915.

TABLE 16

| | Spiral Flow (cm) | |
|---|---|---|
| Holding Pressure (bar) | Example 16 | Example 17 |
| 20 | 22.6 | 14.4 |
| 40 | 37.6 | 28.9 |

Demonstration of the Improved UV Resistance of Phenolic Resin Cured PP/EPDM TPV Produced with Higher Versus Lower Crystallinity PP Examples 18 and 19. To further investigate the hypothesis that the higher the crystallinity of the PP used in TPVs, the better the UV resistance, two additional PP/EPDM TPVs were produced; one using a 2.2 MFR Ziegler-Natta PP (Example 19) versus an equivalent MFR metallocene PP (Example 18). It is well known that metallocene PP is lower in crystallinity than Ziegler-Natta PP, due to the greater stereo and regio errors in monomer insertion into the polymer chain, in the former material. The compositions of the formulations of Examples 18 and 19 are shown in Table 17.

TABLE 17

| Run. No.<br>Raw Material | Barrel No. | Example 18<br>PHR | Example 19<br>PHR |
|---|---|---|---|
| V 3666B Rubber<br>(Paramount 6001R) | 1 | 175 | 175 |
| Icecap K Clay | 1 | 42 | 42 |
| Zoco 102 Zinc Oxide | 1 | 1.5 | 1.5 |
| SnCl₂ masterbatch | 1 | 1.7 | 1.7 |
| PP1572 | 1 |  | 50.2 |
| Cabot PP6331 Black MB | 1 |  | 25.6 |
| Total M3283WZ | 1 | 50.2 |  |
| LR-22819 (M3766/40% CB) | 1 | 25.6 |  |
| HRJ 16261 RI0 | 8Middle | 12.8 | 12.8 |
| Paralux 6001R Oil #1 | 2Middle | 5.6 | 5.6 |
| Paralux 6001R Oil #2 | 11Middle | 44.9 | 44.9 |
| Total |  | 359.3 | 359.3 |

In Example 18, Total M3283WZ is the majority plastic phase, with a much lower amount of PP being added via the carbon black carrier (Total M3766, 24 MFR mPP, 40 wt % carbon black). In contrast, PP 1572 is the majority plastic phase, with a much lower amount of PP being added via the carbon black carrier (Borealis HE125MO, 12 MFR PP, 40 wt % carbon black), in the all Ziegler-Natta PP formulation of Example 19.

Figure 11:
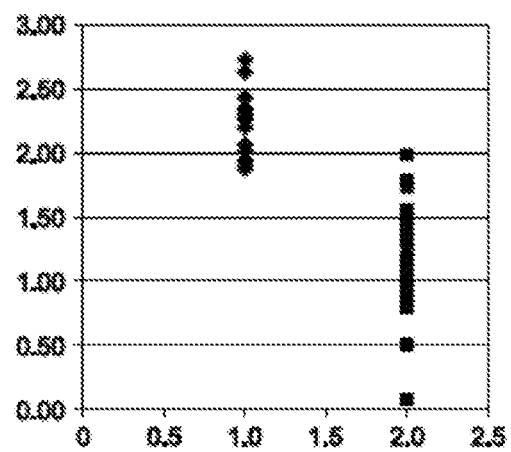
FIGS. 11-12 show the results of weathering testing of TPVs of Examples 18-19.
Figure 12:
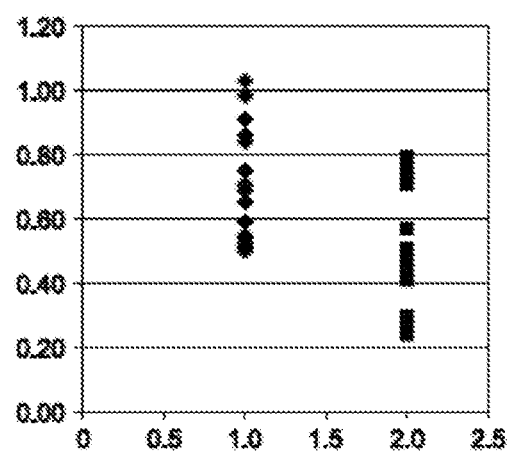

The UV resistance results of the products of Examples 18 and 19 are shown in FIGS. 11 and 12 (18 test replicates per sample; diamonds, Example 18; squares, Example 19) demonstrate the improved UV resistance of the higher crystallinity, all Ziegler-Natta PP formulation, over the lower crystallinity, all metallocene TPV formulation. The visual inspection data is shown in Table 18.

TABLE 18

| Run | Chalk | Visual |
|---|---|---|
| Example 18 | 4 | 5 |
| Example 19 | 4 | 4 |

Surface Enrichment of Moldings from Phenolic Resin Cured Extrusion Grade TPVs by High Flow, High Crystallinity PPs, for Improved UV Resistance Examples 20 to 23. There is at present no commercially available high crystallinity fractional MFR polypropylene. Thus a series of tests were conducted to investigate the difference in weathering performance of TPV extrusion grades that utilize conventional (not high crystallinity) 0.8 MFR polypropylene but employ a high flow, high crystallinity PP, as matrix for introducing the carbon black UV absorber into the TPV. In particular, the carbon black carrier Cabot PP6331 (40 wt % carbon black in 12 MFR Z-N Borealis HE125MO PP) in the control products (Examples 20 (73 Shore A extrusion grade) and 22 (67 Shore A extrusion grade)) is replaced with LR225142 (30 wt % carbon black in 115 MFR high crystallinity Z-N Braskem F1000HC PP) in the inventive formulations (Examples 21 and 23. The compositions of the formulations tested are shown in Table 19.

TABLE 19

| Run. No.<br>Raw Material | Barrel No. | Example 20<br>PHR | Example 21<br>PHR | Example 22<br>PHR | Example 23<br>PHR |
|---|---|---|---|---|---|
| V 3666B Rubber<br>(Paramount 6001R) | 1 | 175 | 175 | 175 | 175 |

TABLE 19-continued

| Run. No.<br>Raw Material | Barrel No. | Example 20<br>PHR | Example 21<br>PHR | Example 22<br>PHR | Example 23<br>PHR |
|---|---|---|---|---|---|
| Icecap K Clay | 1 | 42 | 42 | 42 | 42 |
| Zoco 102 Zinc Oxide | 1 | 1.5 | 1.5 | 1.5 | 1.5 |
| SnCl₂ Masterbatch | 1 | 1.7 | 1.7 | 1.7 | 1.7 |
| ExxonMobil PP5341 | 1 | 50.2 | 41.7 | 39.7 | 31.7 |
| Cabot PP6631 Black MB | 1 | 25.6 |  | 24 |  |
| LR225142<br>(F1000HC/30% CB) | 1 |  | 34.2 |  | 32 |
| HRJ 16261 RI0 | 8Middle | 12.8 | 12.8 | 9.5 | 9.5 |
| Paralux 6001R Oil #1 | 2Middle | 5.6 | 5.6 | 5.8 | 5.8 |
| Paralux 6001R Oil #2 | 11Middle | 44.9 | 44.9 | 52.3 | 52.3 |
| Total |  | 359.3 | 359.3 | 351.5 | 351.5 |

Figure 13:
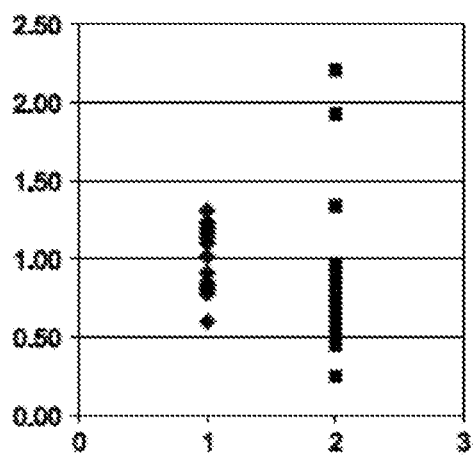
FIGS. 13-14 show the results of weathering testing of TPVs of Examples 20-21.
Figure 14:
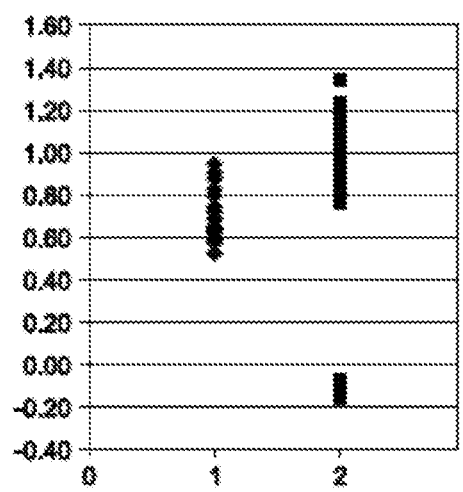

The results of the weathering tests on the products of Examples 20 and 21 are compared in FIGS. 13 and 14 (18 test replicates per sample; diamonds, Example 20; squares, Example 21) and Table 20.

TABLE 20

| Run | Chalk | Visual |
|---|---|---|
| Example 20 of Table 19 | 4 | 4 |
| Example 21 of Table 19 | 5 | 4 |

Figure 15:
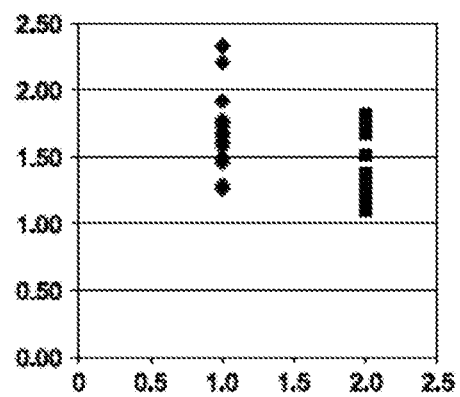
FIGS. 15-18 show the results of weathering testing of TPVs of Examples 22-25.
Figure 16:
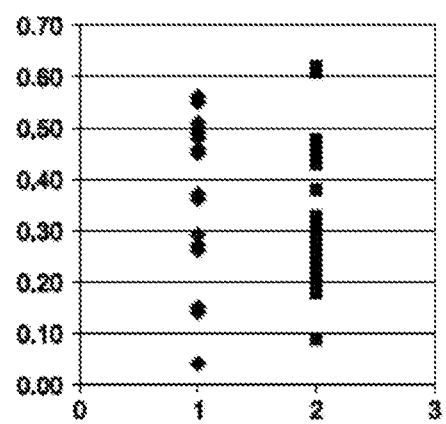

The results of the weathering tests on the products of Examples 22 and 23 are compared in FIGS. 15 and 16 (18 test replicates per sample; diamonds, Example 22; squares, Example 23) and Table 21.

TABLE 21

| Run | Chalk | Visual |
|---|---|---|
| Example 22 of Table 19 | 5 | 4 |
| Example 23 of Table 19 | 5 | 4 |

Thus the UV resistance of these phenolic resin cured extrusion TPV grades was improved by the use of high flow, high crystallinity PP, as the carbon black master carrier. Presumably, surface enrichment of the molded test piece by the high crystallinity PP due to its high flow, is responsible for improvement in UV resistance of the inventive formulations.

Figure 17:
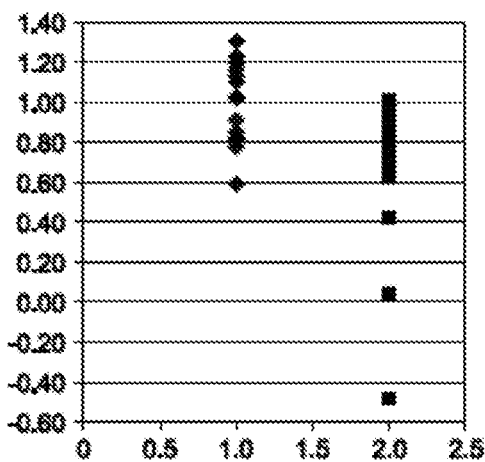
Figure 18:
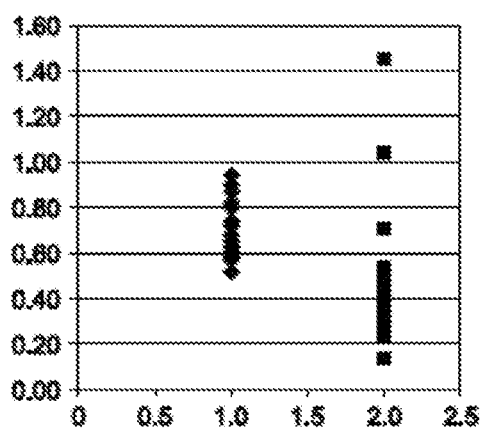

Utility of Increased Stannous Chloride Cure Promoter for Increasing UV Resistance of Phenolic Resin Cured TPVs Examples 24 and 25. As previously described herein, the decomposed phenolic resin curative is an efficient antioxidant in PP/EPDM TPVs, in the presence of a certain level of the stannous chloride cure promoter. Also, it has been illustrated in this invention that these same decomposed phenolic resin residues are detrimental to product UV resistance. However, the UV resistance of TPVs can also be improved by increasing the level of stannous chloride in the formulation. This is illustrated in improved UV aging observed for an extrusion grade TPV (Table 22) that uses high molecular weight PP (PP5341, 0.8 MFR) as the TPV plastic phase. The self-explanatory weathering results are presented in FIGS. 17 and 18 (18 test replicates; diamonds, Example 24; squares, Example 25).

TABLE 22

| Run. No.<br>Raw Material | Barrel No. | Example 24<br>PHR | Example 25<br>PHR |
| --- | --- | --- | --- |
| V 3666B Rubber<br>(Paramount 6001R) | 1 | 175 | 175 |
| Icecap K Clay | 1 | 42 | 42 |
| Zoco 102 Zinc Oxide | 1 | 1.5 | 1.5 |
| SnCl$_2$ Masterbatch | 1 | 1.7 | 2.7 |
| ExxonMobil PP 5341 | 1 | 50.2 | 49.7 |
| Cabot PP6331 Black MB | 1 | 25.6 | 25.6 |
| HRJ 16261 RI0 | 8Middle | 12.8 | 12.8 |
| Paralux 6001R Oil #1 | 2Middle | 5.6 | 5.6 |
| Paralux 6001R Oil #2 | 11Middle | 44.9 | 44.9 |
| Total |  | 359.3 | 359.7 |

The improvement in the UV resistance of TPV formulations containing a high level of SnCl$_2$ is further confirmed by the results of qualitative visual evaluation listed in Table 23.

TABLE 23

| Run | Chalk | Visual |
| --- | --- | --- |
| Example 24 of Table 22 | 4 | 4 |
| Example 25 of Table 22 | 6 | 4 to 5 |

Figure 19:
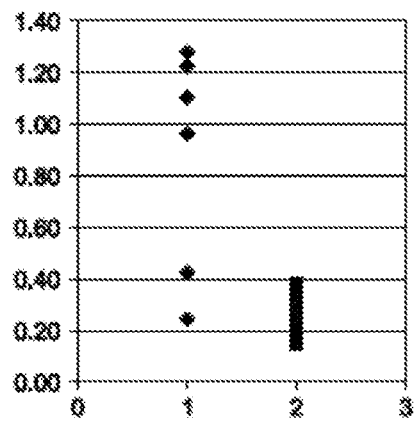
FIGS. 19-20 show the results of weathering testing of TPVs of Examples 24R-25R.
Figure 20:
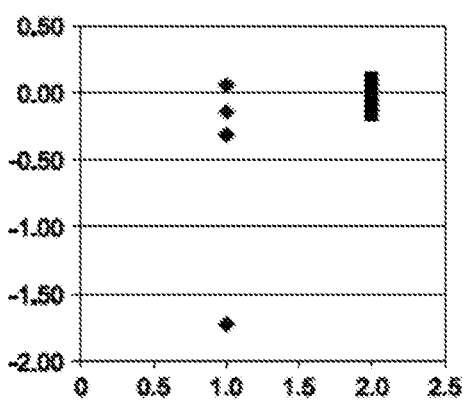

Examples 24 and 25 were recompounded in a separate trial, and product (Example 24R and Example 25R) UV resistance was tested using the 6 test piece protocol. The test results of FIGS. 19 and 20 (diamonds, Example 24R; squares, Example 25R) and Table 24 confirm the utility of increased stannous chloride level in improving the UV resistance of phenolic resin cured PP/EPDM TPVs.

TABLE 24

| Run | Chalk | Visual |
| --- | --- | --- |
| Example 24R | 7 | 4 |
| Example 25R | 8 | 5 |

Figure 21:
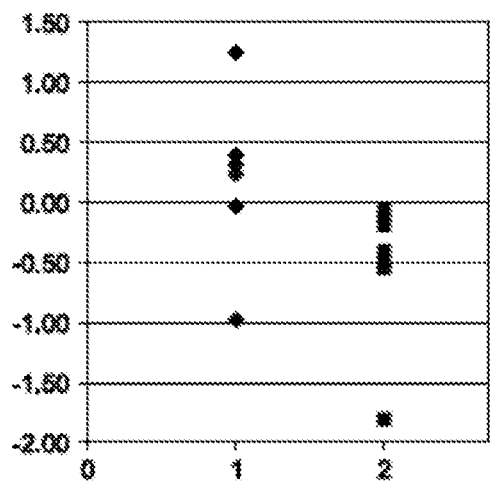
FIGS. 21-22 show the results of weathering testing of TPVs of Examples 26-27.
Figure 22:
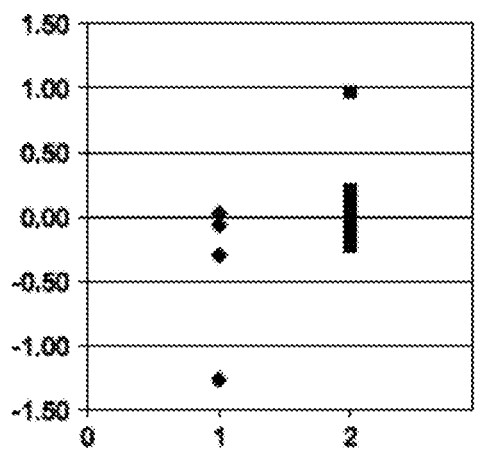

Increased stannous chloride in a talc filed extrusion grade, phenolic resin cured TPV formulation (Table 25), also led to an increase in product UV resistance, as per the data in FIGS. 21 and 22 (6 test replicates; diamonds, Example 26; squares, Example 27) and in Table 26.

TABLE 25

| Run. No.<br>Raw Material | Barrel No. | Example 26<br>PHR | Example 27<br>PHR |
| --- | --- | --- | --- |
| V 3666B Rubber<br>(Paramount 6001R) | 1 | 175 | 175 |
| Imerys Jetfil 625C Talc | 1 | 42 | 42 |
| Zoco 102 Zinc Oxide | 1 | 1.5 | 1.5 |
| SnCl$_2$ Masterbatch | 1 | 1.7 | 2.7 |
| ExxonMobil PP 5341 | 1 | 50.2 | 49.7 |
| Cabot PP6331 Black MB | 1 | 25.6 | 25.6 |
| HRJ 16261 RI0 | 8Middle | 12.8 | 12.8 |
| Paralux 6001R Oil #1 | 2Middle | 5.6 | 5.6 |
| Paralux 6001R Oil #2 | 11Middle | 44.9 | 44.9 |
| Total |  | 359.3 | 359.7 |

TABLE 26

| Sample | Visual | Chalk | dG60° | dG85° |
| --- | --- | --- | --- | --- |
| Example 26 of<br>Table 25 | 5 | 8 | 0 | 3 |
| Example 27 of<br>Table 25 | 4 to 5 | 7 | 0.5 | 6 |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:
1. A thermoplastic vulcanizate composition comprising
   (A) a dispersed rubber phase, including a rubber that has been at least partially cured in the presence of a phenolic resin curing agent;
   (B) a continuous thermoplastic phase, including at least one thermoplastic polymer;
   (C) carbon black;
   (D) a mixture of an alkyl radical scavenger and an alkyl phosphite; and
   (E) one or more of the following:
      (I) the composition further comprises an epoxidized soy bean oil; and
      (II) the thermoplastic phase comprises at least about 10 wt % of one or more polypropylene compound(s) based on the total weight of the thermoplastic phase, wherein the one or more polypropylene compound(s) has a heat of fusion of greater than about 80 J/g and the composition includes (i) about 0.25 to about 0.35 wt % of stannous chloride, based on the total weight of the phenolic resin curing agent and the stannous chloride in the composition; (ii) a non-basic hindered amine light stabilizer; or (iii) a non-basic hindered amine light stabilizer and stannous chloride.

2. The composition of claim 1, wherein the rubber phase comprises an ethylene propylene diene terpolymer.

3. The composition of claim 2, wherein the ethylene propylene diene terpolymer comprises from about 40 to about 85 wt % of ethylene based on the total weight of the ethylene propylene diene terpolymer.

4. The composition of claim 1, wherein the rubber phase is present in the composition in the amount of about 10 to about 80 wt % based on the total weight of the composition.

5. The composition of claim 1, wherein the thermoplastic phase has a melting point from about 167° C. to about 177° C.

6. The composition of claim 1, wherein the thermoplastic phase is present in the composition in the amount of about 10 to about 75 wt % based on the total weight of the composition.

7. The composition of claim 1, further comprising an N-acyl substituted hindered amine light stabilizer.

8. The composition of claim 7, wherein the N-acyl substituted hindered amine light stabilizer comprises N-(N'-Acetyl-2,2,6,6-tetramethylpiperidin-4-yl)-3-dodecyl-2,5-pyrrolidindione.

9. The composition of claim 1, wherein the alkyl radical scavenger is selected from hydroxyl amine, hydroxyl amine-containing compounds, lactone, lactone-containing compounds, chromanol, and chromanol-containing compounds.

10. The composition of claim 1, wherein the alkyl radical scavenger is selected from 6-chromanol-containing compounds.

11. The composition of claim 1, wherein the alkyl radical scavenger is a 6-chromanol-containing compound selected from the group consisting of compounds of formula:

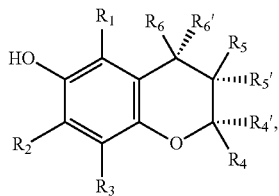

wherein each of R1, R2, R3, and R6 are independently selected from hydrogen and C1 to C10 linear alkyls or branched alkyls; and
each of R4 and R5 (and R4' and R5') are independently selected from hydrogen and C1 to C30 linear or branched alkyls.

12. An article comprising the composition of claim 1.

13. The composition of claim 1, wherein the one or more polypropylene compound(s) has a heat of fusion of greater than about 95 J/g.

14. The composition of claim 1, wherein the composition further comprises an epoxidized soy bean oil and (i) the continuous thermoplastic phase consists essentially of polypropylene and/or (ii) the rubber comprises ethylidenenorbornene.

15. The composition of claim 1, wherein the composition comprises the epoxidized soy bean oil.

16. The composition of claim 1, wherein the thermoplastic phase comprises at least about 10 wt % of one or more polypropylene compound(s) based on the total weight of the thermoplastic phase, wherein the one or more polypropylene compound(s) has a heat of fusion of greater than about 80 J/g and the composition includes about 0.25 to about 0.35 wt % of stannous chloride, based on the total weight of the phenolic resin curing agent and the stannous chloride in the composition.

17. A process for producing a thermoplastic vulcanizate composition comprising:
(A) combining a cross-linkable rubber, a thermoplastic polymer, an alkyl radical scavenger, an alkyl phosphite, and a phenolic resin curing agent;
(B) melting the thermoplastic polymer and crosslinking the rubber to produce a heterogeneous product comprising particles of the rubber dispersed in a matrix comprising the thermoplastic polymer;
(C) adding an epoxidized soy bean oil to the heterogeneous product; and
(D) recovering a thermoplastic vulcanizate composition.

18. The process of claim 17, wherein the epoxidized soy bean oil is added in amount of about 5 to about 70 wt %, based on the total weight of phenolic resin curing agent and epoxidized soy bean oil.

19. The process of claim 17, wherein the alkyl radical scavenger is added in amount from about 0.005 to about 0.05 wt %, based on the total weight of the composition.

20. The process of claim 17, wherein the alkyl phosphite is added in amount from about 0.05 to about 0.5 wt %, based on the total weight of the composition.

21. The process of claim 17, wherein the alkyl radical scavenger and alkyl phosphite are added as a mixture in a paraffin oil.

22. A process for producing a thermoplastic vulcanizate composition comprising:
(A) combining a cross-linkable rubber, a thermoplastic polymer comprising at least about 10 wt % of a polypropylene having a heat of fusion greater than 80 J/g, a phenolic resin curing agent, an alkyl radical scavenger, an alkyl phosphite, and stannous chloride;
(B) melting the thermoplastic polymer and crosslinking the rubber to produce a heterogeneous product comprising particles of the rubber dispersed in a matrix comprising the thermoplastic polymer;
(C) adding a non-basic hindered amine light stabilizer to the heterogeneous product produced; and
(D) recovering a thermoplastic vulcanizate composition.

23. The process of claim 22, wherein the non-basic hindered amine light stabilizer comprises N-(N'-acetyl-2,2,6,6-tetramethyl-4-piperidinyl)-3-dodecylsuccinimide.

24. The process of claim 22, wherein the non-basic hindered amine light stabilizer is added in amount from about 1 to about 5 wt %, based on the total weight of the composition.

25. The process of claim 17, wherein the thermoplastic polymer comprises polypropylene.

26. The process of claim 17, wherein the cross-linkable rubber comprises an ethylene propylene diene terpolymer.

27. An article prepared by the process of claim 17.

* * * * *